United States Patent
Sugiyama et al.

[11] Patent Number: 6,132,290
[45] Date of Patent: Oct. 17, 2000

[54] AUTOMATIC LAPPING METHOD OF A THIN FILM ELEMENT AND A LAPPING APPARATUS USING THE SAME

[75] Inventors: Tomokazu Sugiyama; Motoichi Watanuki; Kazuo Yokoi; Yoshiaki Yanagida; Koji Suto, all of Kawasaki, Japan

[73] Assignee: Fujitsu Limited, Kawasaki, Japan

[21] Appl. No.: 08/988,994

[22] Filed: Dec. 11, 1997

[30] Foreign Application Priority Data

Apr. 10, 1997 [JP] Japan .................................. 9-092479

[51] Int. Cl.$^7$ ............................. G11B 5/127; B24B 49/00
[52] U.S. Cl. ................................. 451/10; 451/11; 451/41; 451/278
[58] Field of Search ........................... 451/9, 10, 11, 451/41, 5, 285, 287, 288, 278

[56] References Cited

U.S. PATENT DOCUMENTS

| | | | |
|---|---|---|---|
| 5,023,991 | 6/1991 | Smith | 29/603 |
| 5,136,817 | 8/1992 | Tabata et al. | 451/5 |
| 5,203,119 | 4/1993 | Cole | 51/165.77 |
| 5,214,589 | 5/1993 | Tang | 364/468 |
| 5,337,015 | 8/1994 | Lustig et al. | 324/671 |
| 5,913,550 | 6/1999 | Watanuki | 29/603.1 |

*Primary Examiner*—Eileen P. Morgan
*Attorney, Agent, or Firm*—Greer, Burns & Crain, Ltd.

[57] ABSTRACT

The present invention relates to an automatic lapping method and a lapping apparatus for lapping a work piece, which is bonded to a row bar, including a thin-film element in order to control the lapping process by accurately measuring height of the work piece. The automatic lapping apparatus may include a lapping plate for lapping a thin-film, which is bonded to a row bar, including a monitoring element having at least an analog resistance value which is analogously varied according to lapping; and a controller for converting the analog resistance value to height of said thin-film element and controlling said lapping plate to stop the lapping process when the height of the thin-film element has reached to a targeted value, wherein said controller employs a previously measured resistance value as a currently measured resistance value when the currently measured resistance value is less than the previously measured resistance value.

6 Claims, 25 Drawing Sheets

AUTOMATIC LAPPING METHOD OF A THIN FILM ELEMENT AND A LAPPING APPARATUS USING THE SAME

BACKGROUND OF THE INVENTION

1. Field of the Invention

The present invention relates to an automatic lapping method for lapping a work piece including a thin film element. More particularly, it relates to an automatic lapping method for continuously lapping the work piece, as detecting a height of the thin film element, and to a lapping apparatus using the same.

For example, after forming a magnetic head thin film, the magnetic head thin film is lapped on the process of manufacturing a magnetic head. Heights of a magnetic resistance layer and a gap of the magnetic head thin film of the magnetic head are made to be constant by lapping during the manufacturing process of the magnetic head.

For the heights of the magnetic resistance layer and the gap, sub-micron order of accuracy is required. Therefore, it is necessary to lap work pieces or magnetic thin films with high accuracy.

2. Description of the Related Art

FIGS. 22A and 22B are explanatory diagrams of a composite type magnetic head.

As shown in FIG. 22A, the composite type magnetic head includes a magnetic resistance element 82 formed on a base plate 81 and a writing element 85. The magnetic resistance element 82 is formed of a magnetic resistance film 83 and a pair of conducting films 84 as shown in FIG. 22B. A resistance value of the magnetic resistance element 82 is varied by an external magnetic field. The magnetic resistance element 82 has a function to read out an electric current having a value according to magnetic field strength of a track 90 on a magnetic disk.

As the magnetic resistance element 82 is an element for reading out the current, it is required to provide a different element 85 for writing. The writing element 85 includes an inductive head. The inductive head is comprised of a lower magnetic pole 86, an upper magnetic pole 88 faced to the lower magnetic pole 86 with a certain gap, and a coil 87 provided between the lower and upper magnetic poles 86 and 88 to magnetically excite them. A non-magnetic insulating layer 89 is provided around the coil 87.

In such a composite type magnetic head, it is required to have a constant resistance value of the magnetic resistance film 83 in the magnetic resistance element 82 for each magnetic head. However, it is difficult to make the resistance value be constant or uniform on the process of manufacturing the thin film for the magnetic head. Therefore, after forming the thin film of the magnetic head, a height (width) h of the magnetic resistance film 83 is adjusted so that a resistance value may be uniformed.

FIGS. 23A, 23B, 24A, 24B, 24C and 24D are diagrams explaining the process of manufacturing the composite type magnetic head.

As shown in FIG. 23A, a plurality of composite type magnetic heads are formed on a semiconductor wafer 100 by a thin film technique. Next, as shown in FIG. 24B, the wafer 100 is cut into strips to make a plurality of row bars 101. A row bar 101 includes a plurality of the magnetic heads 102 arranged in one row. Resistance elements 102a are provided on the left and right ends, and at the center of the row bar 101 for monitoring the process of the manufacturing.

As described above, the height of the magnetic resistance film 83 for the magnetic head 102 is lapped to be constant or uniform. However, the row bar 101 is extremely thin, for example, about 0.3 mm. It is, therefore, difficult to mount the row bar 101 directly to a lapping jig, and as shown in FIG. 24C, the row bar 101 is bonded to a mounting tool or base 103 with heat dissoluble wax.

Then, as shown in FIG. 24A, the row bar 101, which is bonded to the mounting base 103, is placed on a lapping plate 104 for lapping the row bar 101. As known in Japanese Unexamined patent application published No. 2-124262 (U.S. Pat. No. 5,023,991) or Japanese Unexamined patent application published No. 5-123960, the resistance value of the resistance element 102a for monitoring is always measured while lapping the row bar 101. Then, it can be detected whether or not the magnetic resistance film of the magnetic head 102 has reached a targeted height.

When it is detected by the measurement of the resistance value that the magnetic resistance film has been lapped to the targeted height, the lapping processing is stopped. After that, a slider can be formed on a bottom surface 101-1 of the row bar 101, as shown in FIG. 24B.

The row bar 101 is further cut into a plurality of magnetic heads 102, as the row bar 101 is mounted on the mounting base 103 as shown in FIG. 24C. Each magnetic head 102 is taken out from the mounting base 103 by heating and melting the heat dissoluble wax, as shown in FIG. 24D.

In this way, a row bar 101 including a plurality of the magnetic heads 102 is prepared, and lap processing is performed for the row bar 101. Therefore, the magnetic resistance film on the plurality of magnetic heads 102 can be lapped by one step.

FIGS. 25A and 25B are explanatory diagrams of a conventional lapping apparatus.

As shown in FIG. 25A, a resistance element 102a for monitoring lapping processes, i.e., an ELG element, is formed of an analog resistance 102-1 and a digital resistance 102-2. As shown in FIG. 25B, the analog resistance 102-1 has a pattern in which the resistance value Ra becomes larger in proportion to reducing the height h of the ELG element 102a by lapping.

Therefore, it is possible to detect a height of the ELG element 102a by measuring the value of the analog resistance 102-1. That is, the relationship between the resistance value Ra and the height h of the ELG element 102a can be nearly expressed by the following equation:

$$Ra = a/h + b \qquad (1)$$

The height of the ELG element 102a is approximately equal to the height of the magnetic resistance film of the magnetic head 102. Therefore, it is possible to obtain the height of the magnetic resistance film by detecting the height of the ELG element 102a.

However, the relationship between the value of the analog resistance 102-1 and the height of the ELG element is varied according to the condition of the lapping processes. Therefore, a digital resistance 102-2 is provided as shown in Japanese Unexamined Patent application No. 2-124262 (U.S. Pat. No. 5,023,991).

A value Rv of the digital resistance 102-2 is varied on off positions predetermined in advance as expressed in a line graph of FIG. 25B. The off positions of the digital resistance 102-2 can be detected from the variation of the value of the digital resistance 102-2. Thereby, it becomes possible to correct the equation (1) expressing the relationship between the height of the ELG element 102a and the value of the analog resistance 102-1. That is, coefficients a and b in the relational equation (1) can be corrected.

In this way, the height of the magnetic resistance film is measured as measuring the values of the analog and digital resistances while lapping. When the height of the magnetic resistance film has reached to a target value, lapping is finished. In such the lapping method as explained above, the value of the digital resistance 102-2 is differentiated in time to detect the off positions of the digital resistance.

In such a method for measuring the resistance values in the ELG element and controlling the lapping processes, there has been some problems as follows.

At first, as shown in FIG. 25B, the varying value of the digital resistance Rv becomes small according to the reduction of the height of the ELG element. In the above explained method, it is impossible to accurately detect the off positions, because the value of the digital resistance 102-2 is differentiated in time to detect the off positions of the digital resistance. Therefore, there is a problem of lower accuracy in lapping the work piece.

Secondly, it is impossible to correctly measure resistance values because the resistance values are lowered due to influences caused by contacting the lapping plate 104 to measure the resistance values while lapping a work piece. Therefore, there has been a problem of lower accuracy in lapping the work piece.

SUMMARY OF THE INVENTION

Accordingly, it is an object of the present invention to provide an automatic lapping method for measuring resistance values correctly to realize accuracy in lapping and a lapping apparatus using the same.

It is another object of the present invention to provide an automatic lapping method for correctly detecting off positions of a digital resistance to realize accuracy in lapping and a lapping apparatus using the same.

It is a further object of the present invention to provide an automatic lapping method for removing abnormal resistance values to realize accuracy in lapping and a lapping apparatus using the same.

DESCRIPTION OF THE PREFERRED EMBODIMENTS

Figure 1:
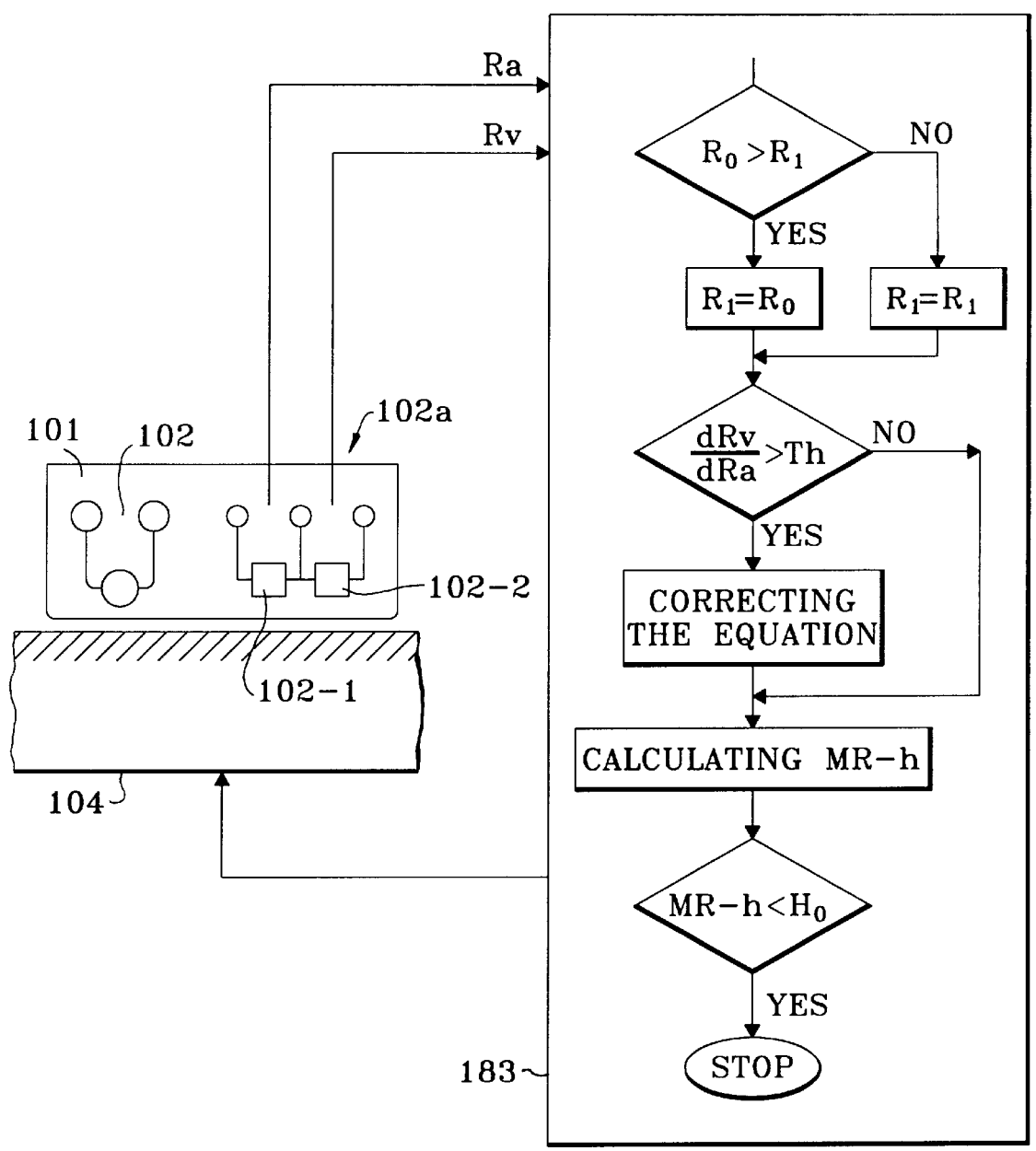
FIG. 1 is a principle diagram of the present invention.

Embodiments according to the present invention will be now explained in accompanying with the attached drawings. Throughout the following descriptions, the same reference numerals and symbols are used to denote and identify corresponding or identical components.

FIG. 1 is a principle diagram of the present invention.

A lapping apparatus according to the present invention includes a monitoring element 102a including an analog resistance 102-1 of which a resistance value Ra is analogically varied while lapping a work piece and a digital resistance 102-2 of which a resistance value Rv is varied linearly while lapping the work piece and a thin film element 102, and a lapping plate 104 for lapping the work piece, which is bonded to the row bar 101. A controller 183 measures the resistance values in the monitoring element 102a and controls the lapping plate 104 to finish the lapping process.

An automatic lapping method according to the present invention including a monitoring element having an analog resistance value which is analogously varied and a digital resistance value which is digitally varied according to process of lapping the thin film element, includes the steps of differentiating the value of the digital resistance with the value of the analog resistance, detecting off-positions of the digital resistance of the monitoring element according to the differentiated value of the digital resistance, correcting an correlation equation expressing a relationship between the value of the analog resistance and the height of the thin-film element by measured values of the analog resistance on off-timings of the digital resistance, converting the analog and digital resistance values of the monitoring element into height of the thin-film element, and controlling stopping of lapping the thin film element when the height of the thin-film element reaches a target value.

In the present invention, the off-positions of the digital resistance 102-2 can be detected by differentiating the value of the digital resistance 102-2 with the value of the analog resistance 102-1. The value of the analog resistance 102-1 is sharply varied with the reduction of the height of the ELG element. The differentiated value becomes larger by differentiating the value of the digital resistance 102-2 with the value of the analog resistance 102-1. Thereby, it becomes possible to correctly detect the off-positions of the digital resistance 102-2.

Therefore, a correlation equation expressing the relationship between the value of the analog resistance 102-1 and the height of the thin-film element can be corrected accurately. Thereby, it is also possible to correctly control the lapping process by detecting the analog resistance.

Additionally, in another mode of the present invention, the lapping apparatus includes a row bar 101, a monitoring element 102a having, at least, an analog resistance 102-1 of which resistance value is analogously varied according to the lapping process, a thin film element 102, a lapping plate 104 for lapping the work piece, which is bonded to the row bar 101, and a controller 183 for measuring the resistance value in the monitoring element 102a to control the lapping plate 104 to finish the lapping process.

The automatic lapping method includes the steps of converting the resistance value in the monitoring element 102a to height of the thin film element 102, and controlling the lapping plate 104 to finish the lapping process when the height of the thin film element 102a reaches a targeted value. The converting step includes the step for employing the previously measured value as the currently measured value when the currently measured resistance value is less than the previously measured resistance value.

In this mode of the present invention, as the height of the thin film element, which is bonded to a low bar 101, becomes smaller, the resistance value in the monitoring element 102a becomes smaller. Accordingly, if the measured resistance value is normal, the currently measured value should become larger than the previously measured value. If the currently measured value is less than the previously measured value, an abnormal resistance value may be measured for some reason.

By removing the abnormal measured resistance value, it becomes possible to correctly control the lapping process according to the measurement of the resistance value. Then, the currently measured value is removed, i.e., the measured resistance value is lost. However, it is possible to complete by employing the previously measured normal value. Therefore, it becomes possible to improve the accuracy of the lapping processes.

Figure 2:
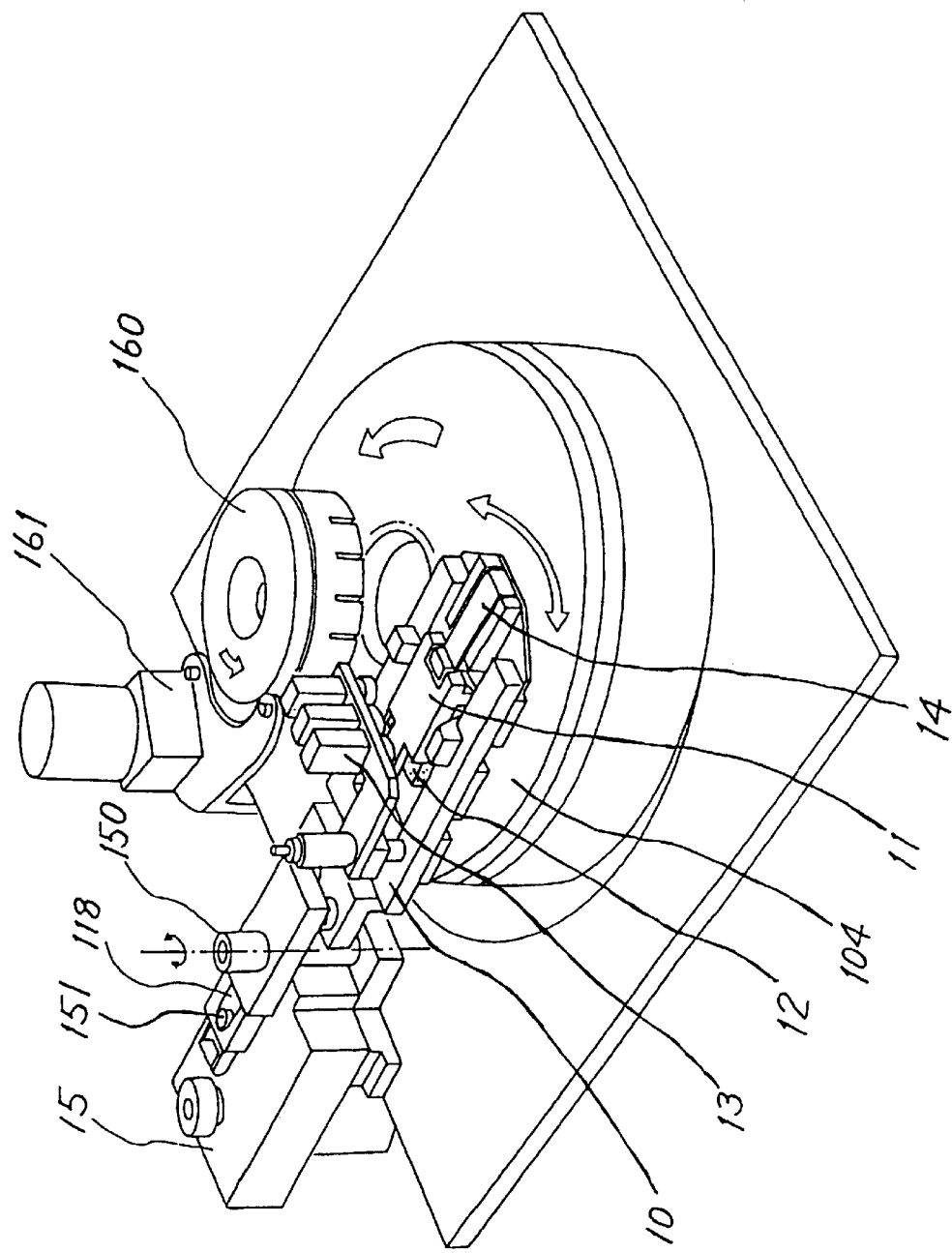
FIG. 2 is a perspective view of an example of a lapping apparatus employing the present invention.
Figure 3:
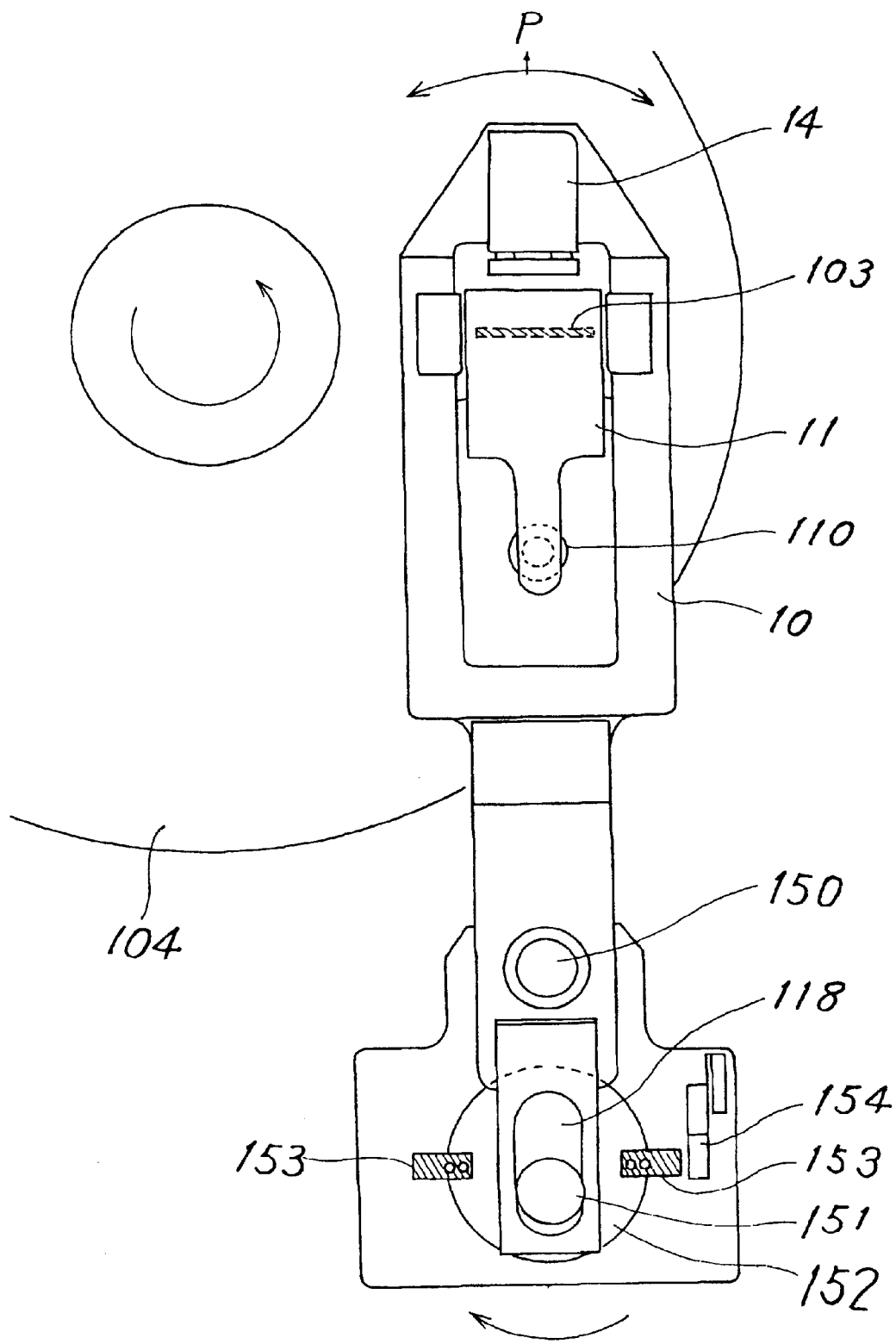
FIG. 3 is a top view of the lapping apparatus shown in FIG. 2.
Figure 4:
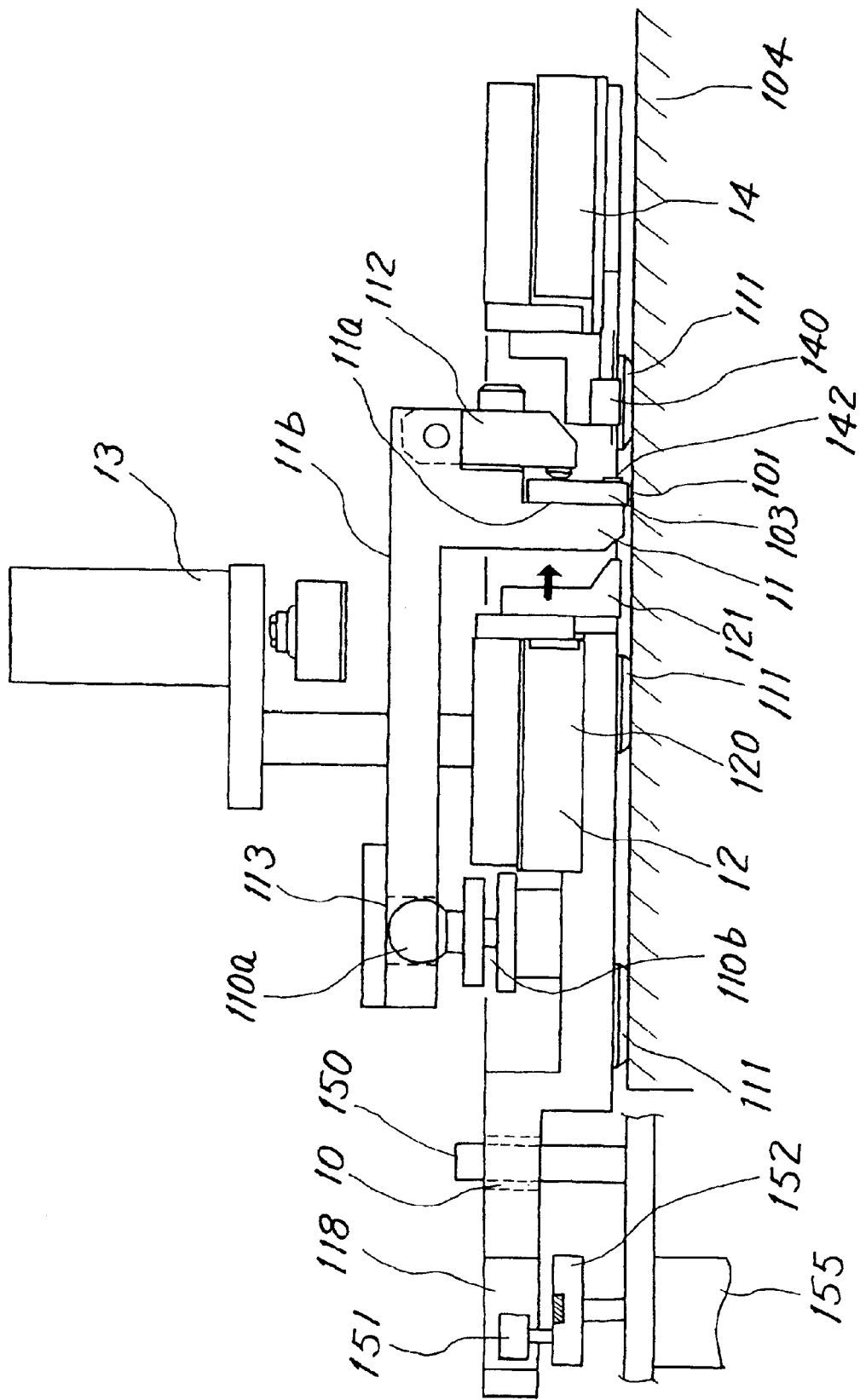
FIG. 4 is a side view of the lapping apparatus shown in FIG. 2.
Figure 5:
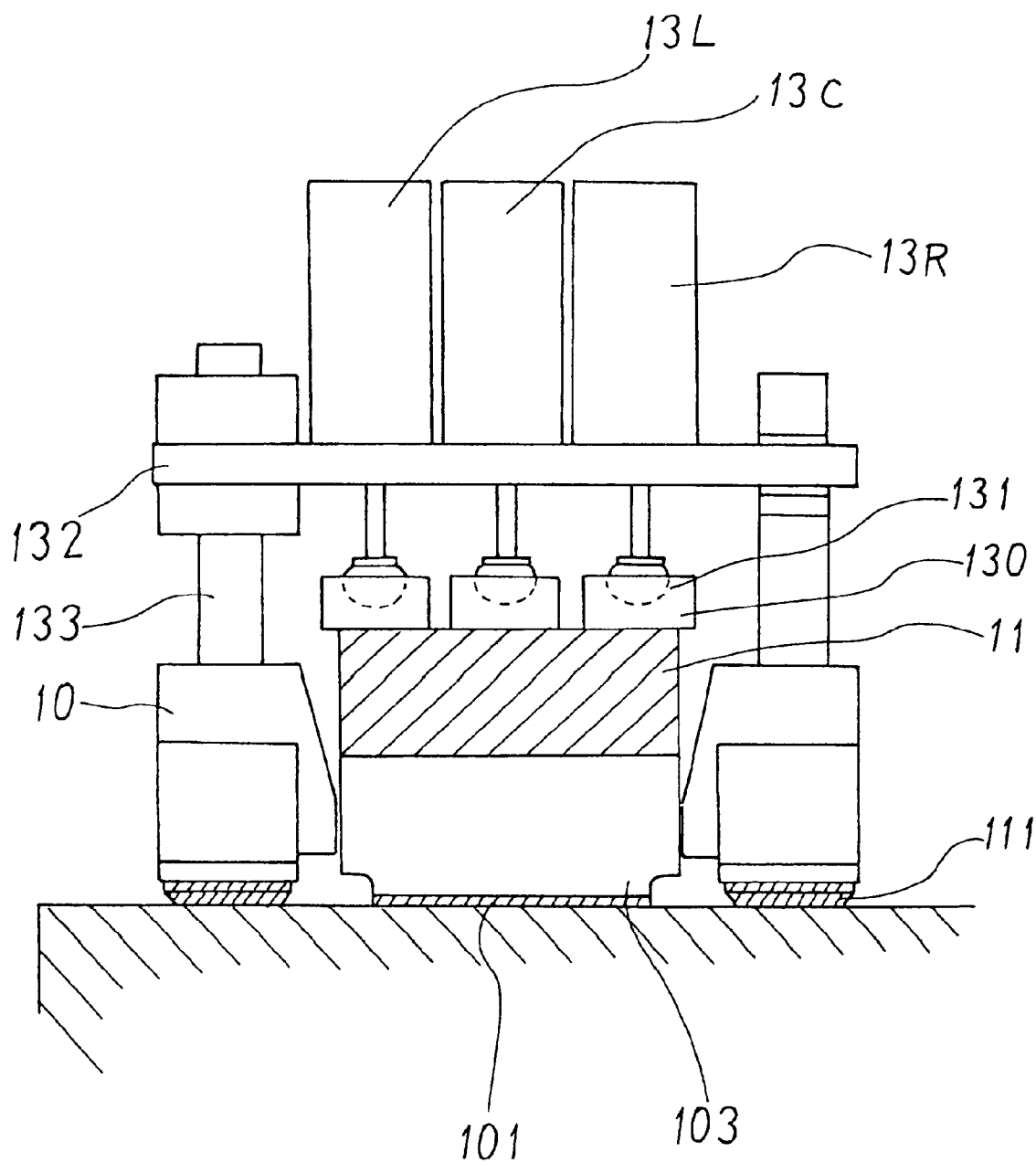
FIG. 5 is a cross sectional diagram of the lapping apparatus shown in FIG. 2.

FIG. 2 is a perspective view of one example of a lapping apparatus according to the present invention, FIG. 3 is a top view of the lapping apparatus of one embodiment according to the present invention, FIG. 4 is a side view of the lapping apparatus shown in FIG. 2, and FIG. 5 is a cross sectional view of the lapping apparatus shown in FIG. 2.

As shown in FIGS. 2, 3 and 4, the lapping plate 104 is rotated by a motor, not shown in the diagrams. Six pads 111 are provided under a lapping base 10. The lapping base 10 is set on a rotary shaft 150 fixed on the apparatus, so that the base 10 can be rotated around the shaft 150. A cam 118 is provided on other end of the lapping base 10.

A swinging mechanism 15 swings the lapping base 10. The swinging mechanism 15 has a swinging motor 155, a cam pulley 152 rotated by the swing motor 155, a swing cam 151 provided on the cam pulley 152. A swinging cam 151 is engaged with a cam hole 118 of the lapping base 10, as shown in FIGS. 3 and 4.

Therefore, the lapping base 10 swings toward an arrow having both directions shown in FIG. 3 according to the rotation of the swinging motor 155. Two sensor actuators 153 are provided on a cam pulley 152. The sensor 154 detects the sensor actuators 153. The sensor actuators 153 are positioned so as to be detected by the sensor 154 when the lapping base 10 is located on a point P, i.e., a central point of swinging, shown in FIG. 3.

Returning back to FIG. 2, a pressure mechanism 13, which are explained later, is provided on the lapping base 10. The pressure mechanism 13 puts pressure on the adapter 11. The adapter 11 is set on the lapping base 10. The adapter 11 is formed like a L formation as illustrated in FIG. 4. A mounting base 103 to which a work piece 101 is bonded is set on a first surface 11a of the adapter 11. The mounting base 103 is fixed to the first surface 11a of the adapter 11 by a fixing mechanism 112.

The adapter 11 has a second surface 11b. A holder 113 is provided on an end of the second surface 11b. A supporting mechanism 110 provided on the lapping base 10 has a screw 110b for adjusting the height, and a spherical supporting section 110a. The holder 113 of the adapter 11 is engaged with the supporting section 110a.

Therefore, the adapter 11 is supported by the lapping base 10 at one point. The adapter 11 contacts a lapping plate 104 via the processing surface of the work piece 101. That is, the adapter 11 is supported at one point by the supporting mechanism 110, and at other two points by both edges of the mounting base 103, to which the work piece 101 is bonded. Thereby, the mounting base 103 can be rotated around the center of the supporting mechanism so that the mounting base 103 can follow the lapping plate 104 independently of the lapping base 10.

Accordingly, the work piece bonded to the mounting base 103 can be lapped by referencing the lapping plate 104 as a standard regardless of the accuracy of the lapping base 10. Thereby, it becomes possible to uniformly lap the work piece 101.

Returning back to FIG. 2, an unload mechanism 12 is provided on the lapping base 10. The unload mechanism 12 pushes the adapter 11 as shown in FIG. 4 so that the adapter 11 rotates around the supporting section 110a to evacuate the work piece 101 from the lapping plate 104. This unload mechanism 12 has an unload block 121 and an unload cylinder 120.

Unload operation will be now explained. When a value of a resistance for monitoring the lapping of the row bar 101 becomes a predetermined value, it is required to stop the lapping. When the rotation of the lapping plate 104 is stopped, lapping is stopped. However, the lapping plate 104 is stopped after reducing the speed by a stopping instruction. Therefore, the work piece continues to be lapped until the lapping plate 104 is finally stopped, thus causing dispersion of accuracy of the size of the work piece, that is, a row bar 101. Additionally, there is a case where a mark of the lapping plate is put on the work piece.

Therefore, an unload cylinder 120 and an unload block 121 are provided on the lapping base 10 as shown in FIG. 4. As shown in FIG. 4, the unload cylinder 120 is activated to stick the unload block 121 out when the resistance value for monitoring the lapping becomes the predetermined value. Then, the adapter 11 rotates above around the supporting section 110a to separate the row bar 101 from the lapping plate 104. Thereby, when the resistance value for monitoring the lapping becomes the predetermined value, lapping may be immediately stopped. Therefore, accuracy of the size of the row bar 101 can be realized. Further, as the adapter 11 is set on the lapping base 10, unloading of the work piece, that is, a row bar 101 becomes easy.

As shown in FIG. 3, when the sensor 154 detects that the actuators 153 are positioned at the point P, i.e., the central point of swinging, the unloading is performed. This is because the mark of the lapping plate 104 is put on the lapping plate of the work piece according to the stopped position if the stop position of the swinging mechanism is random.

It is inclined to put the mark of the surface 104 on the work piece because speed of swinging becomes lower on both ends of swinging portion. On the contrary, the speed of swinging becomes highest at the center position P of swinging. Therefore, it is not easy to put the mark of the lapping plate 104 on the work piece. The sensor 154 detects that the actuator 153, i.e., the sensor 154 detects that the lapping base 10 reaches the center position P of swinging, unloading of the work piece is performed as described above. Thereby, it is possible to prevent from putting the mark of the lapping plate 104 on the work piece 101 when the swinging mechanism stops.

The probe mechanism 14 is provided on the end of the lapping base 10. The probe mechanism 14 electrically contacts an resistance element for monitoring processing of the work piece, that is, the row bar 101 mounted to the mounting base 103. The probe mechanism 14 has a probe 140 electrically, which contacts an resistance element for monitoring the processing.

Returning back to FIG. 2, a correction ring 160 is rotated by a modified ring rotary mechanism 161. The correction ring 160 expands slurry (abrasive liquid) and fills the slurry into the lapping plate 104, so that the flatness of the lapping plate 104 may be kept.

As shown in the cross sectional view of FIG. 5, the pressure mechanism 13 includes three pressure cylinders 13L, 13C and 13R. The pressure cylinders 13L, 13C and 13R are supported by a supporting plate 132. The supporting plate 132 can rotate around a rotary shaft 133. Therefore, when setting the adapter 11 to the lapping base 10, it is possible to release upper space of the lapping base 10 and set the adapter 11 to the lapping base 10 by rotating the supporting plate 132.

Figure 6A:
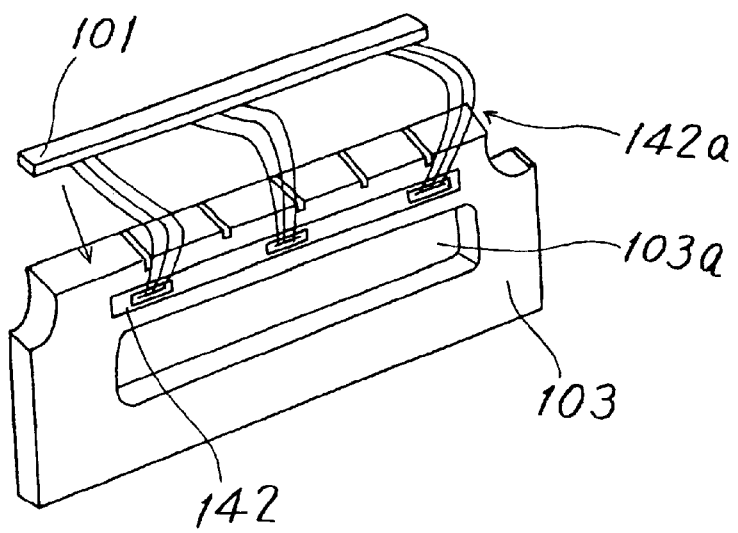
FIGS. 6A and 6B are explanatory diagrams of a work shown in FIG. 2.
Figure 6B:
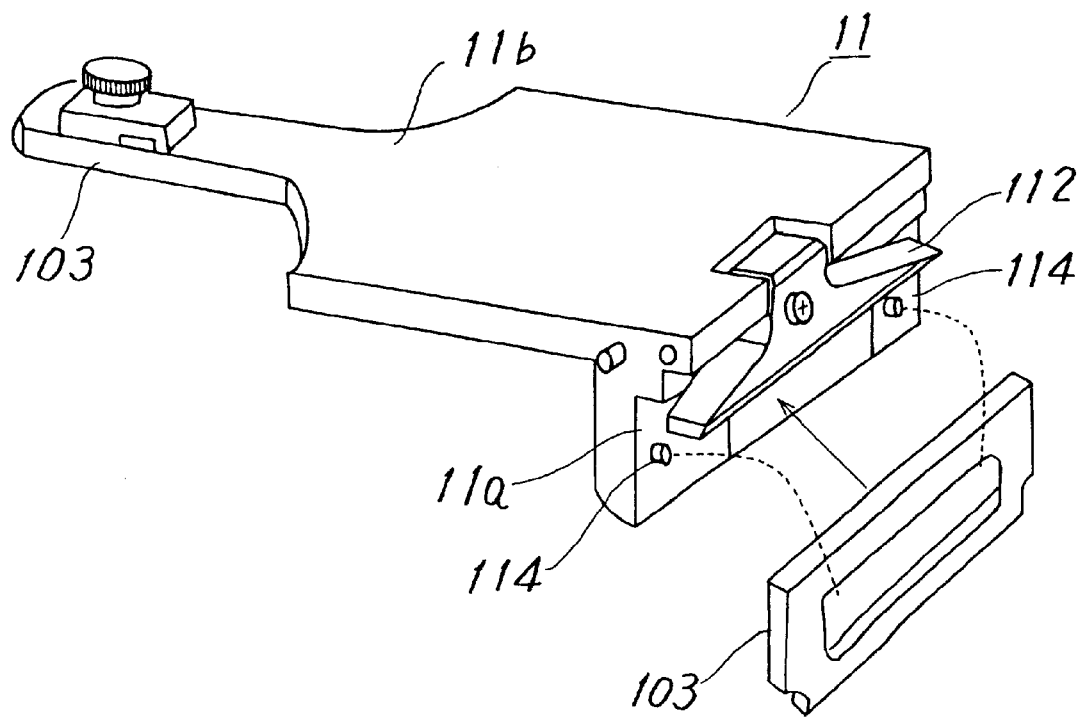
Figure 7:
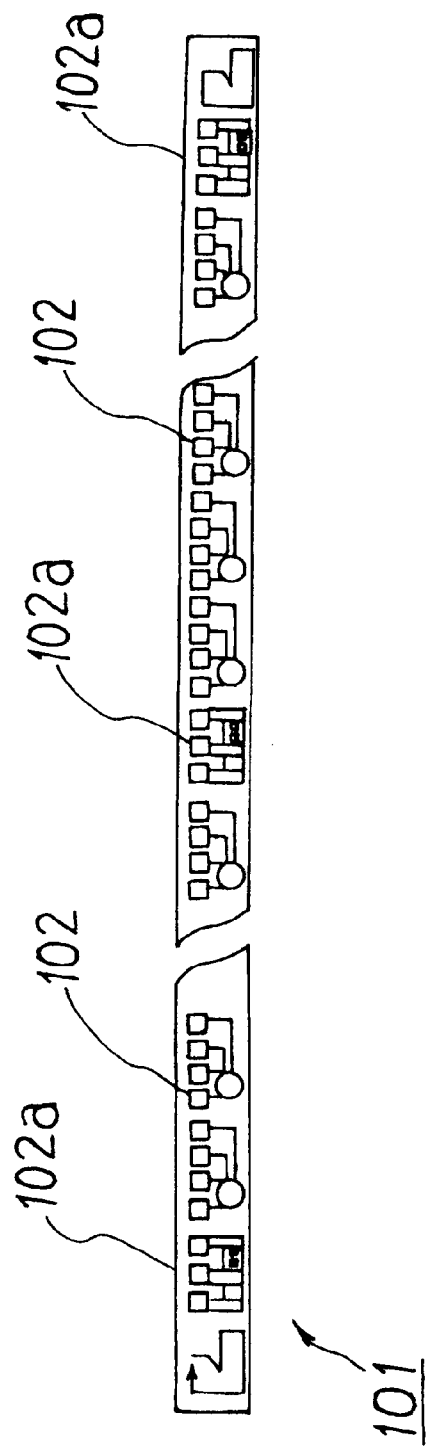
FIG. 7 is an explanatory diagram of a row bar shown in FIGS. 6A and 6B.
Figure 8:
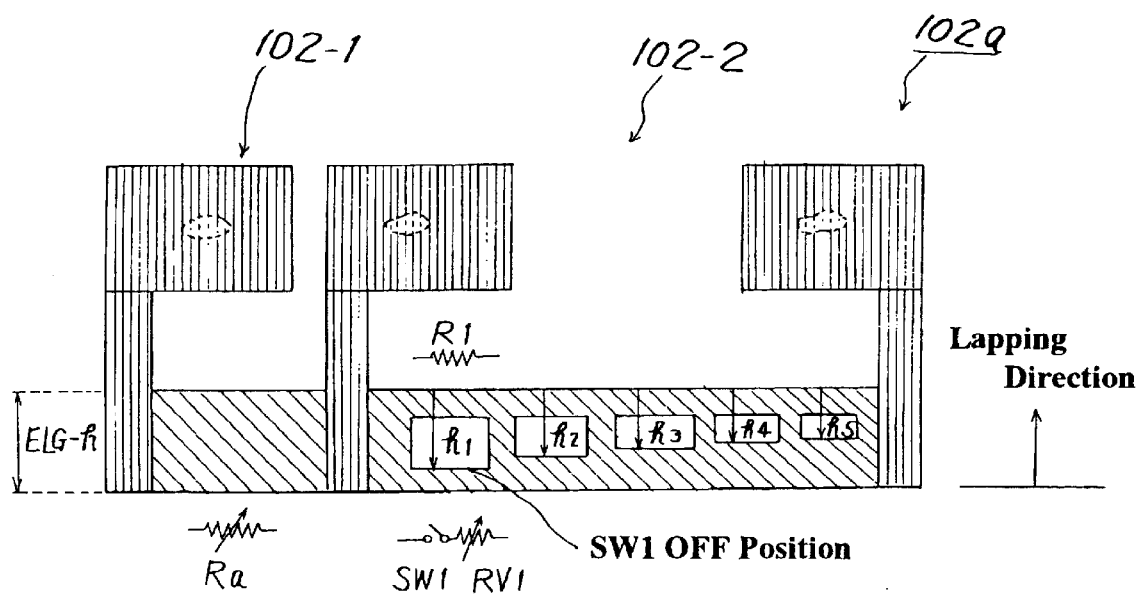
FIG. 8 is a structural diagram of an ELG element shown in FIG. 7.
Figure 9A:
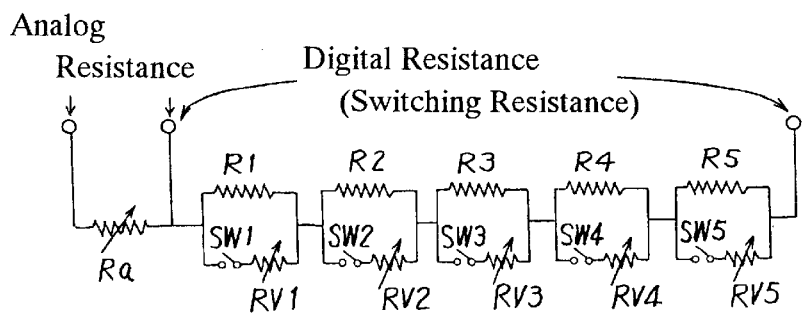
FIGS. 9A and 9B are explanatory diagrams of an ELG element shown in FIG. 8.
Figure 9B:
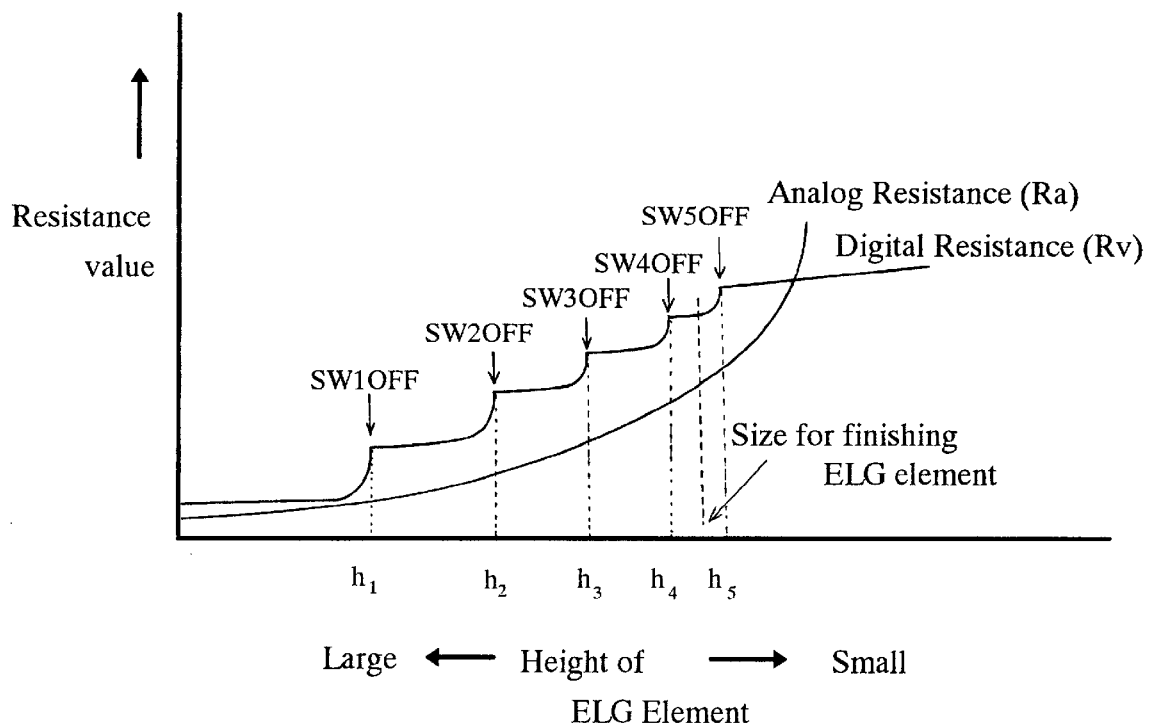

FIGS. 6A and 6B are explanatory diagrams of the work piece, FIG. 7 is an explanatory diagram of a row bar, FIG. 8 is a structural diagram of an ELG element shown in FIG. 9, and FIGS. 9A and 9B are explanatory diagrams of an ELG element shown in FIG. 8.

As shown in FIG. 6A, the mounting base 103 has a mounting hole 103a. The row bar 101 is bonded on the mounting base 103. A terminal printed circuit board 142 is provided on the mounting base 103. The terminal printed circuit board 142 has a large space. The terminals of resistance elements for monitoring on the row bar 101 described later, i.e., ELG elements, are connected to terminals of the terminal printed circuit board 142 by bonding wires 142a.

The terminal space of ELG elements on the row bar 101 is small. Additionally, the terminals of the ELG elements are covered with the abrasive liquid. Therefore, even if the terminals are directly contacted to a probe 140, resistance measurements can not be stably executed. Therefore, in the present invention, the probe 140 is contacted to the terminal printed circuit board 142. As the terminal printed circuit board 142 can be provided on the position away from the lapping surface 104, it may have a large terminal space thereon. It becomes possible to execute stable resistance measurement.

As shown in FIG. 6B, the mounting base 103 may be mounted to the adapter 11. The adapter 11, which engages a hole 103a of the mounting base 103 has protrusions 114 for supporting the mounting base 103, and a fixing block 112. The mounting base 103 is positioned by the protrusions 114, and is set between the first surface 11a and the fixing block 112.

As shown in FIG. 7, the row bar 101 includes a plurality of magnetic heads 102 and ELG elements 102a. The ELG elements 102a are provided on three positions of left, center, and right of the row bar 101.

As shown in FIG. 8, the ELG element is formed of an analog resistance 102-1 and a digital resistance 102-2. The analog resistance 102-1 has a pattern in which value of resistance becomes larger according to the reduction of the resistance film. The digital resistance 102-2 includes a pattern in which the value of resistance becomes off when the resistance film is reduced until becoming a constant value.

Therefore, an equivalent circuit is expressed as shown in FIG. 9A, and the analog resistance 102-2 is expressed as a variable resistance Ra. As shown in FIG. 9B, as the height of the ELG element reduces, the resistance value increases. The digital resistance 102-2 is expressed by five switch resistances as shown in FIG. 9A. Then, FIG. 9B shows a line graph showing variation on each of off positions of the resistances.

The resistance value of the ELG element corresponds to the height of the ELG element. The relationship between the value of resistance Ra of the ELG element and the height h of the ELG element can be nearly expressed as the above-described equation (1).

Coefficients a and b in the equation (1) can be obtained by an experiment in advance. However, the characteristic is varied depending on each ELG element. The digital resistance is provided to compensate such a problem. The off positions h1 to h5 of the digital resistances are predetermined in advance. The off position of a digital resistance is detected and the measured resistance values and the off position are substituted for the equation (1). If two of the off points on the digital resistances can be detected, coefficients a and b in the equation (1) can be obtained.

The resistance value of the ELG element comes to the height of the ELG element in this equation (1). Thereby, it is possible to obtain the height of the ELG element by measuring the resistance value of the ELG element. Therefore, it can be judged whether or not the height of the ELG element has reached a targeted value. As mentioned later, as the height of the ELG element reaches the targeted value, lapping is stopped.

Figure 10:
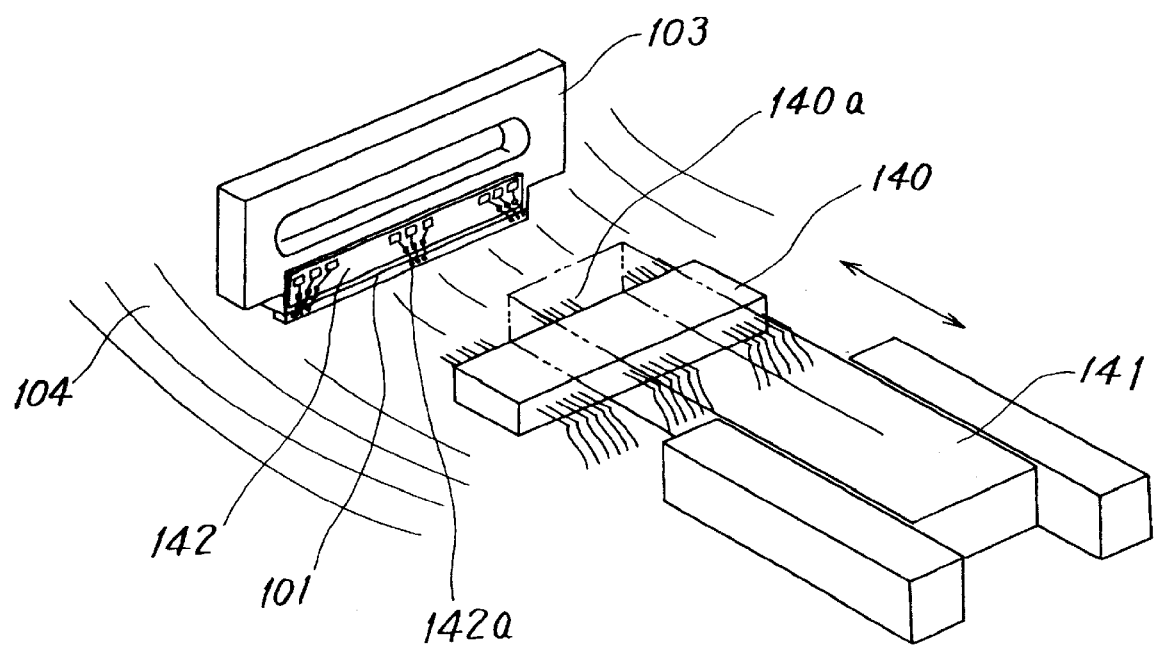
FIG. 10 is an explanatory diagram of a probe mechanism shown in FIG. 2.

FIG. 10 is an explanatory diagram of a probe mechanism shown in FIG. 2.

As shown in FIG. 10, the probe block 140 supports a plurality of probes 140a. The probe block 140 is moved by a probe cylinder 141. The probe cylinder 141 pushes the probe block 140, so that the probe 140a may contact the terminal printed circuit board 142. On the other hand, it makes easy to set the adapter 11 to the lapping base 10 by evacuating the probe 140a.

Figure 11:
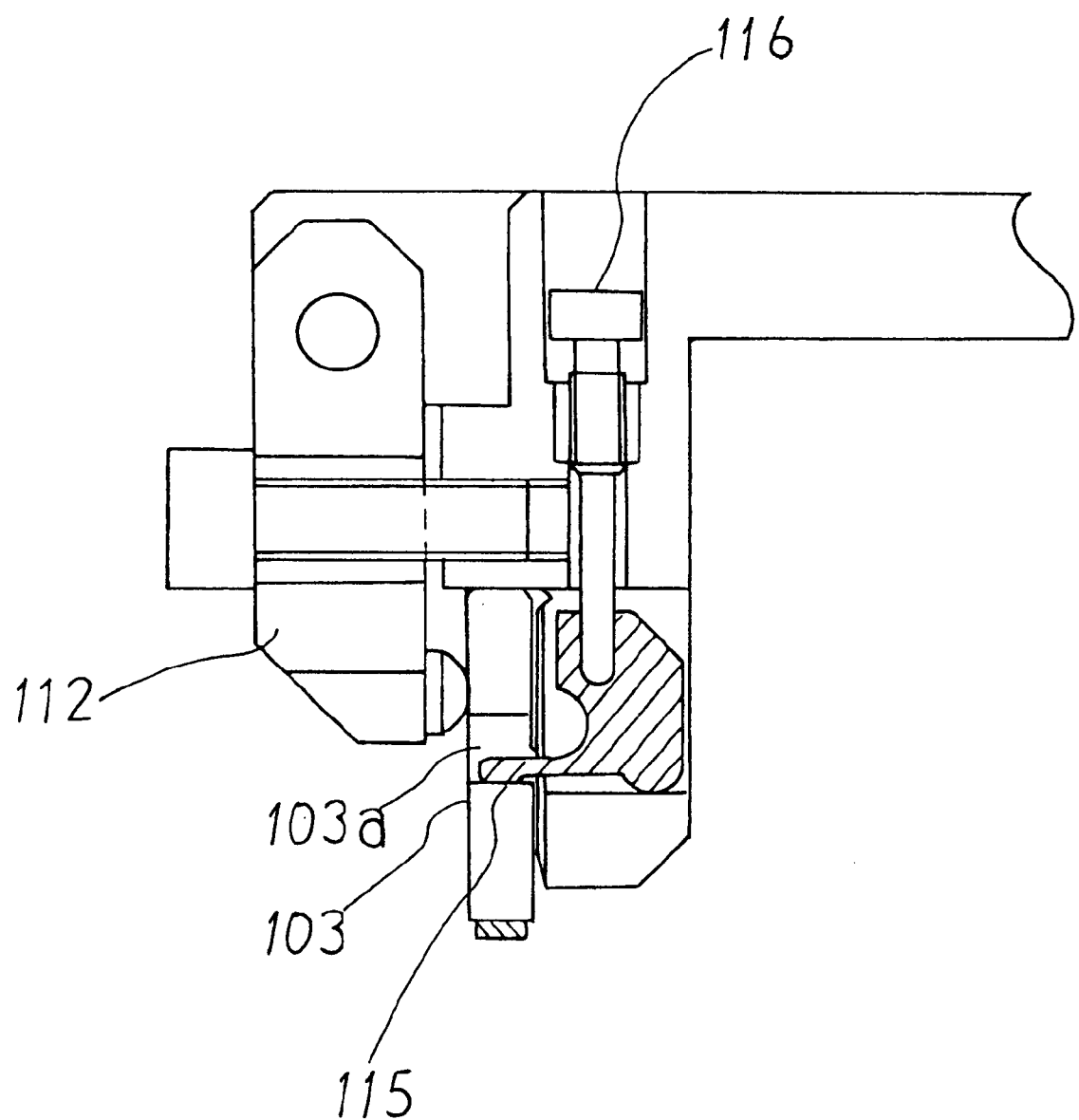
FIG. 11 is a cross sectional view of a bending mechanism shown in FIGS. 6A and 6B.
Figure 12:
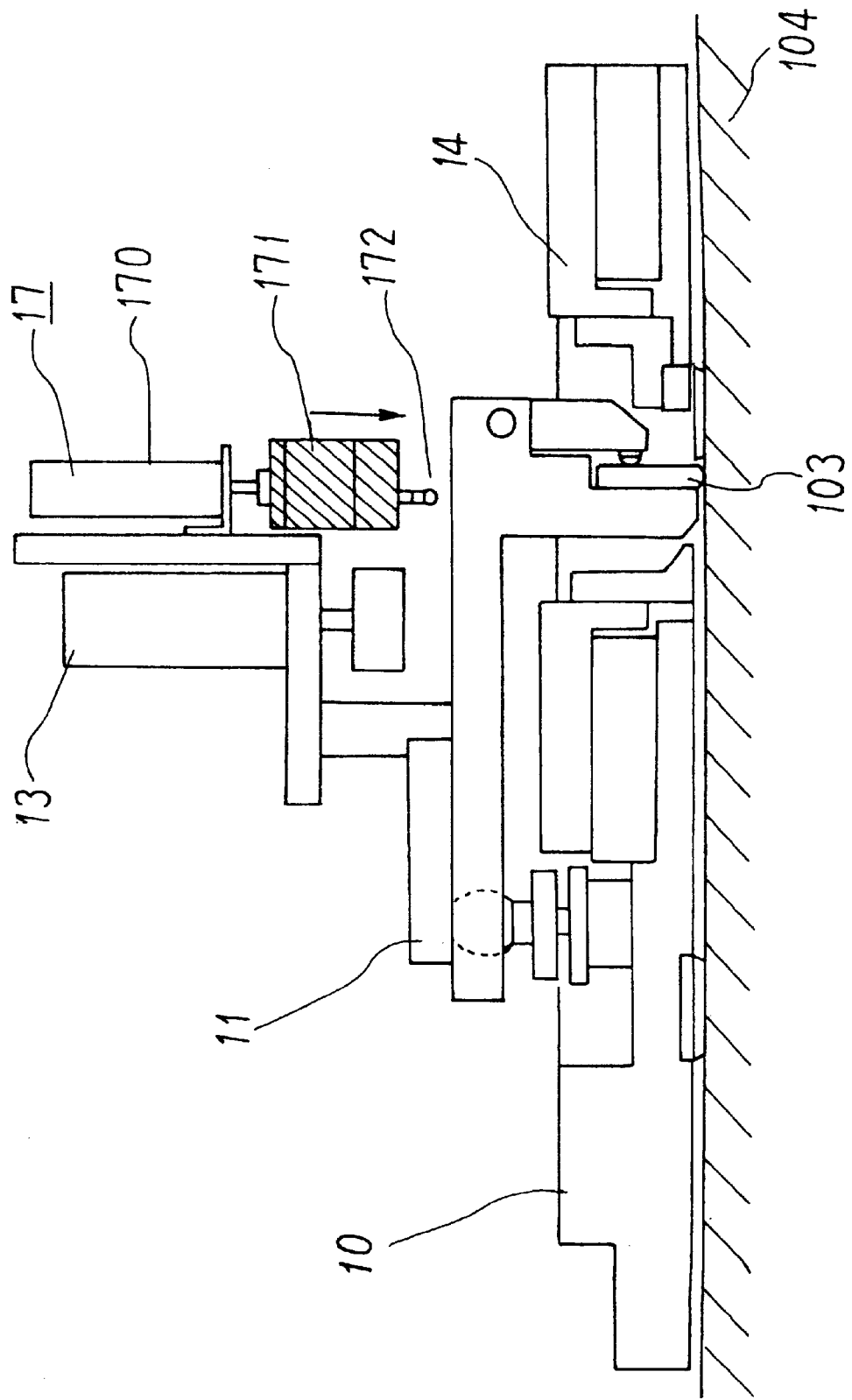
FIG. 12 is an explanatory diagram of a bending mechanism shown in FIGS. 6A and 6B.
Figure 13A:
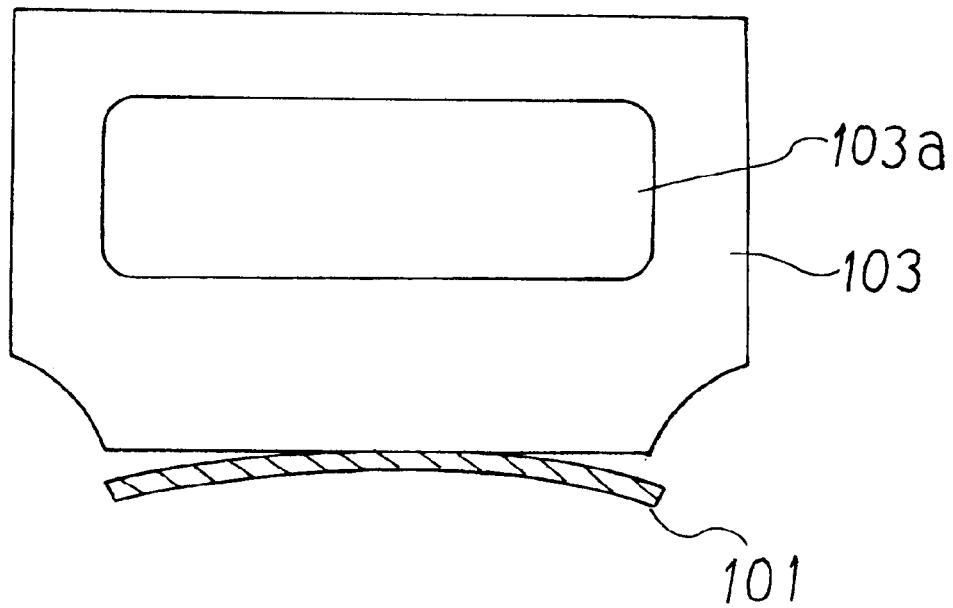
FIGS. 13A and 13B are explanatory diagrams of a bending operation of the bending mechanism shown in FIG. 11.
Figure 13B:
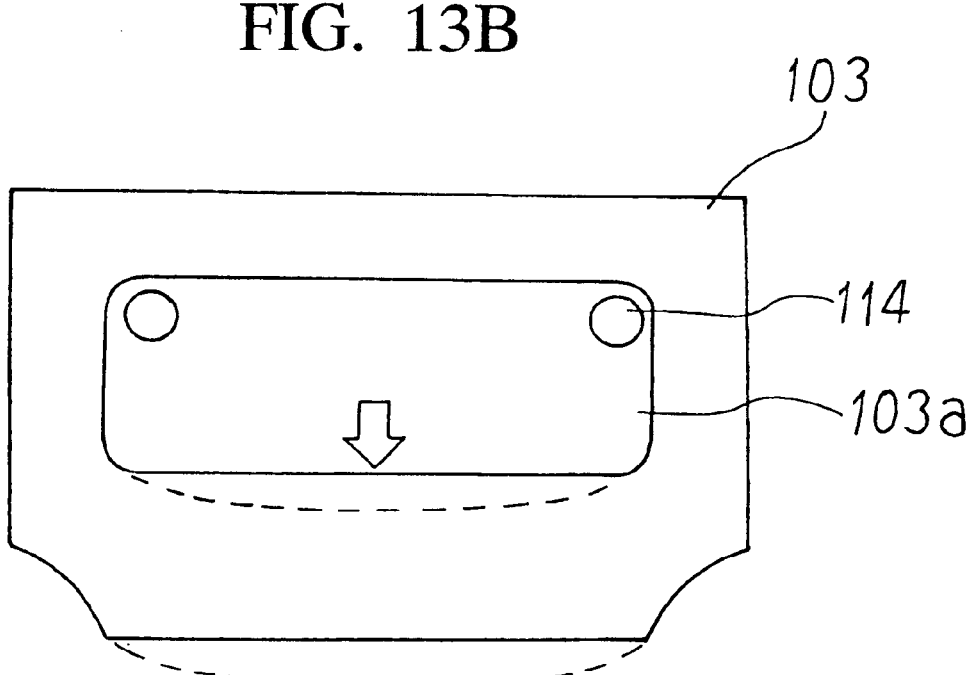

FIG. 11 is a cross sectional view of a bending mechanism shown in FIG. 6B, FIG. 12 is an explanatory diagram of a bending operation, and FIGS. 13A and 13B are explanatory diagrams of a bending operation.

As shown in FIG. 13A, there is a case where the row bar 101 is warped and bonded to the mounting base 103. It is difficult to uniformly lap the work piece, that is the row bar 101, in sub-microns if the warp is present.

A bending mechanism is provided on the adapter 11 in order to correct the warp. As shown in FIGS. 6B and 11, the bending mechanism includes a bending arm 115 and a screw 116 for controlling bending. The bending arm 115 pushes a wall of the mounting hole 103a of the mounting base 103. The screw 116 controls the amount the bending arm 115a.

As shown in FIG. 13B, when the bending arm 115 pushes a center position of the lower section of the wall of the hole 103a, the mounting base 103 is warped and the warp of the row bar 101 is compensated. Amount of compensation is controlled by rotating the screw 116. After bonding the work piece to the row bar 101, the row bar 101 is traced to measure the warp amount. Then, the correcting ratio is determined according to the warp amount.

As shown in FIG. 12, an automatic bending mechanism 17 is provided on the lapping base 10. A wrench 172 is engaged with the screw 116 for controlling bending. A motor 171 rotates the wrench 172. A bending cylinder 170 drives the wrench 172 and the motor 171 toward the control screw 116.

The rotation amount of the motor 171 is controlled according to the measured warp amount to rotate the screw 116. Thereby, it becomes possible to automatically compensate the warp.

Figure 14:
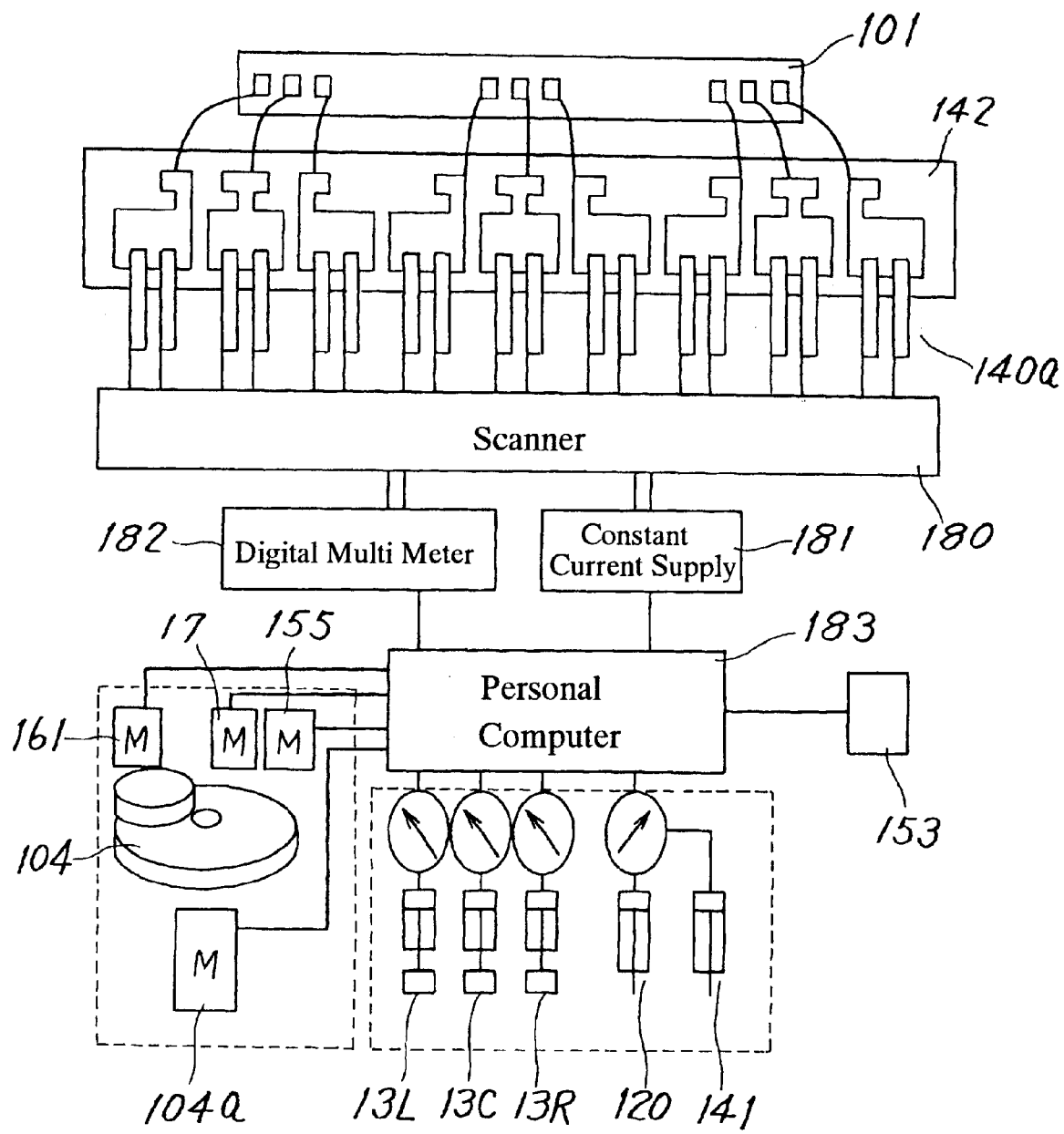
FIG. 14 is a block diagram of one embodiment according to the present invention.
Figure 15:
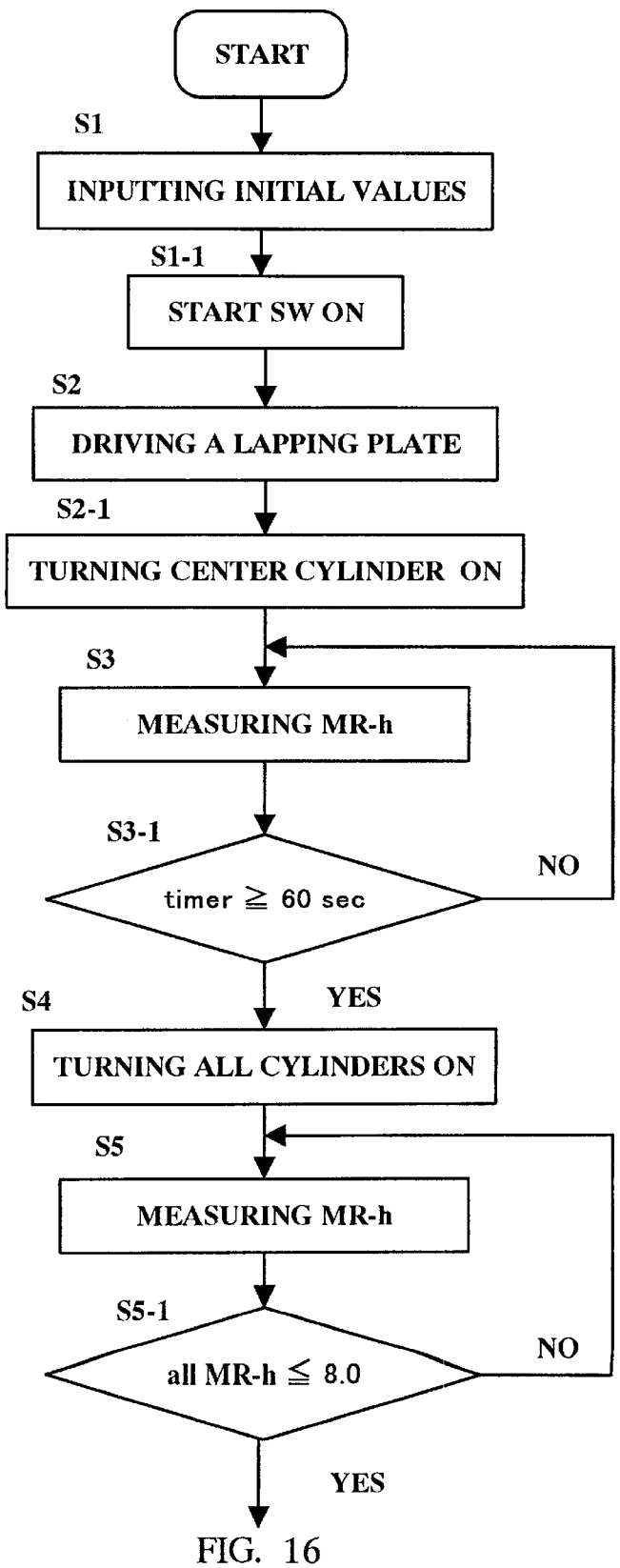
FIG. 15 is a first operational flow chart for the processing in one embodiment according to the present invention.
Figure 16:
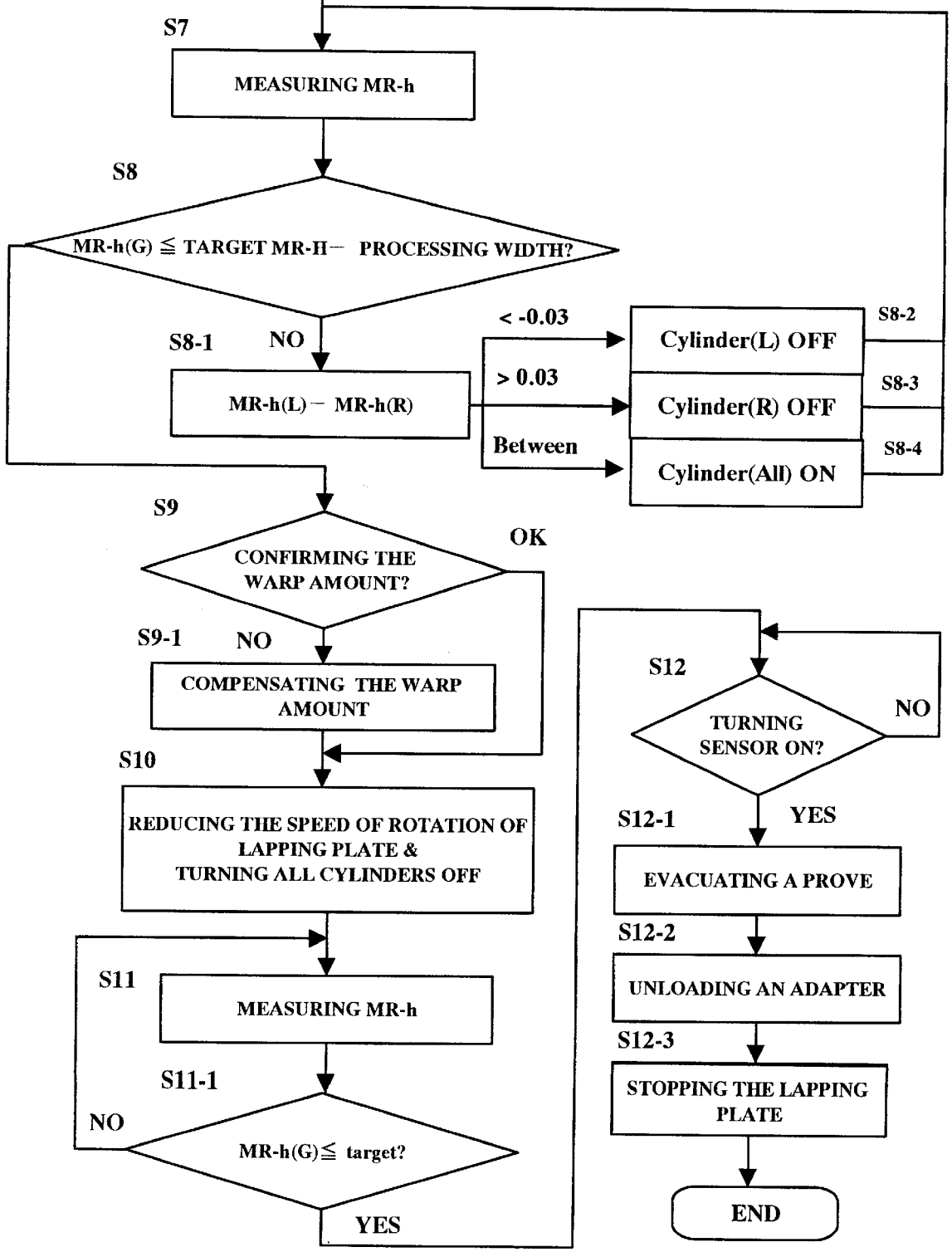
FIG. 16 is a second operational flow chart for the processing in one embodiment according to the present invention.
Figure 17:
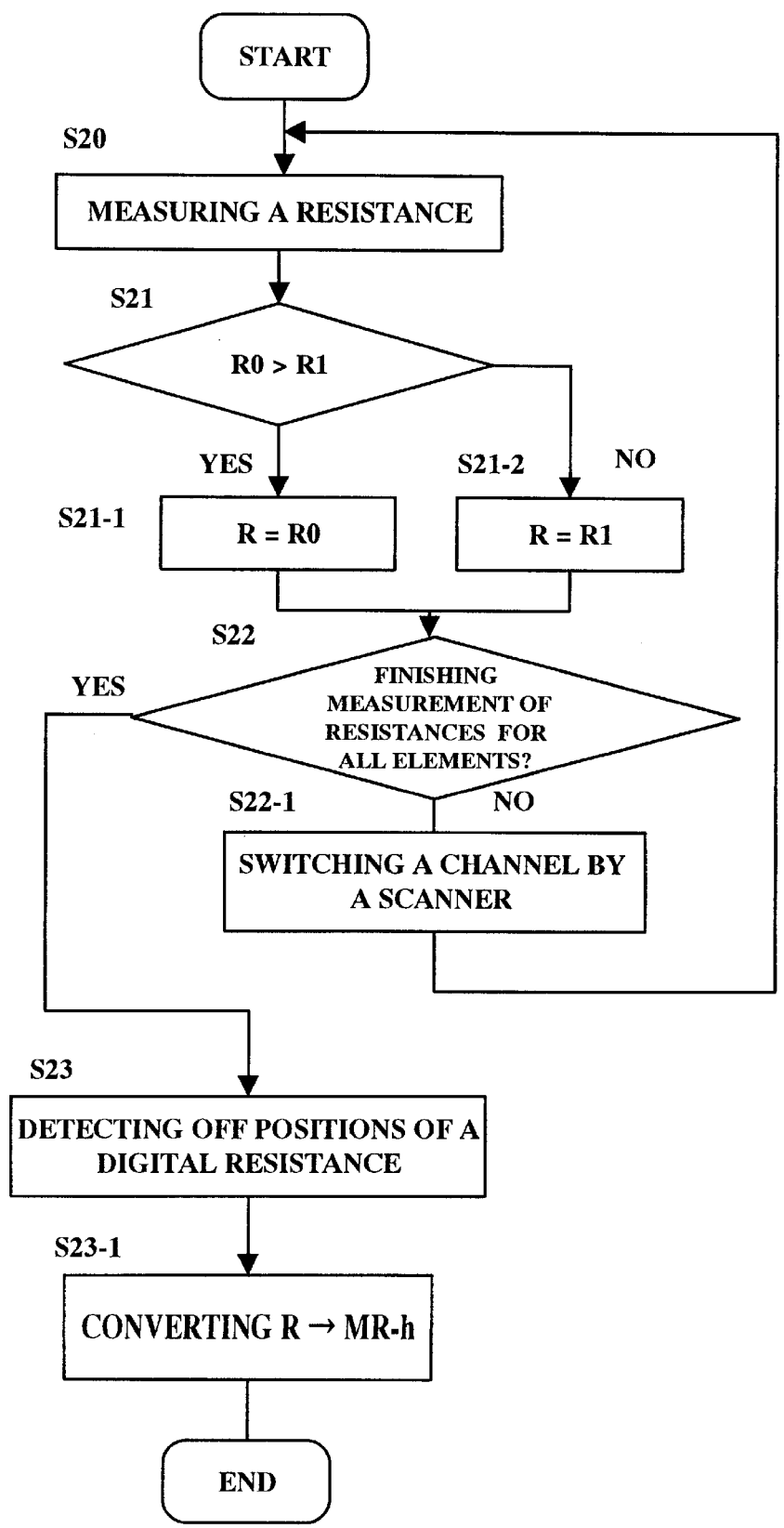
FIG. 17 is an operational flow chart of measuring MR-h shown in FIGS. 15 and 16.
Figure 18:
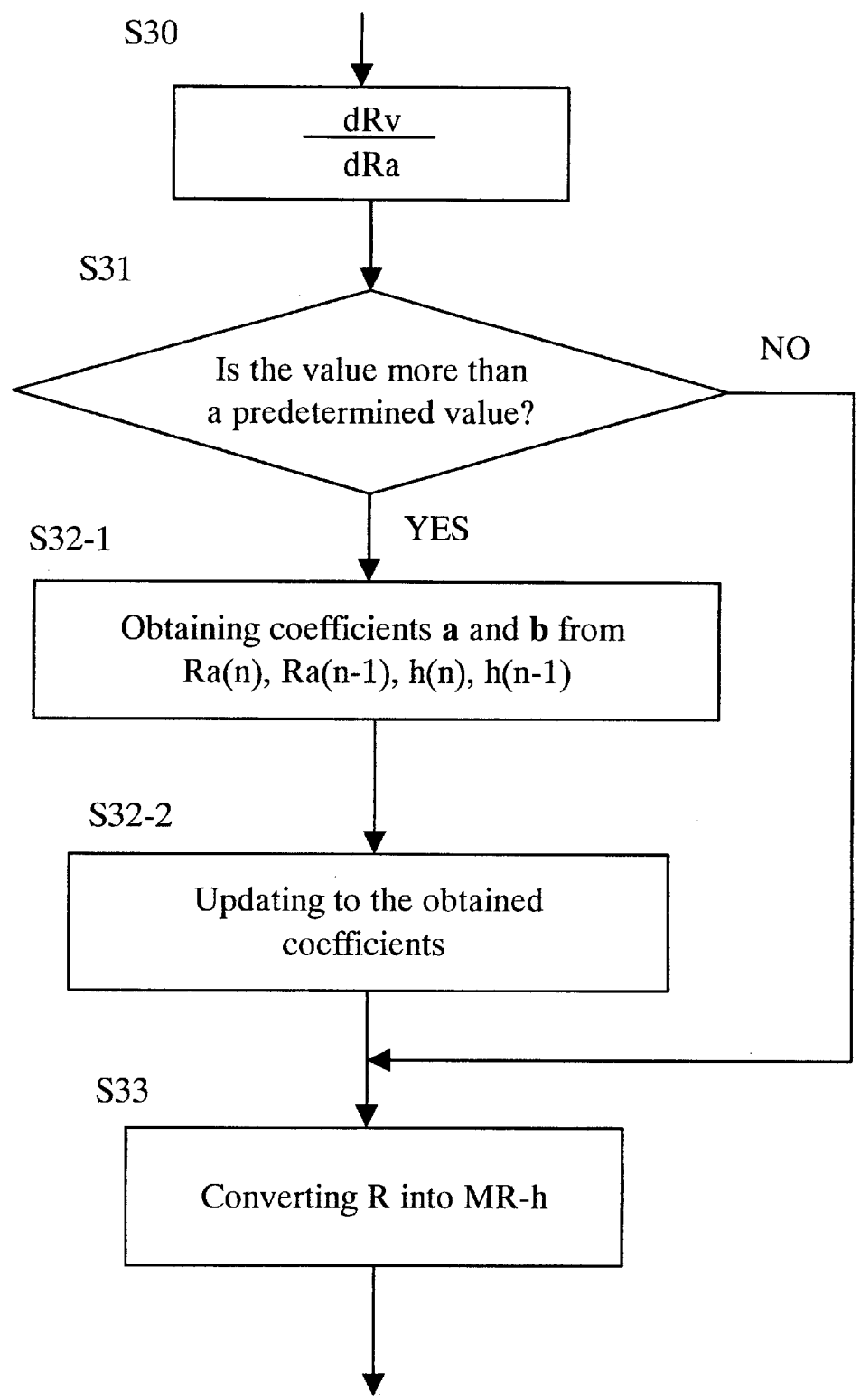
FIG. 18 is an operational flow chart for detecting a digital off position shown in FIG. 17.
Figure 20:
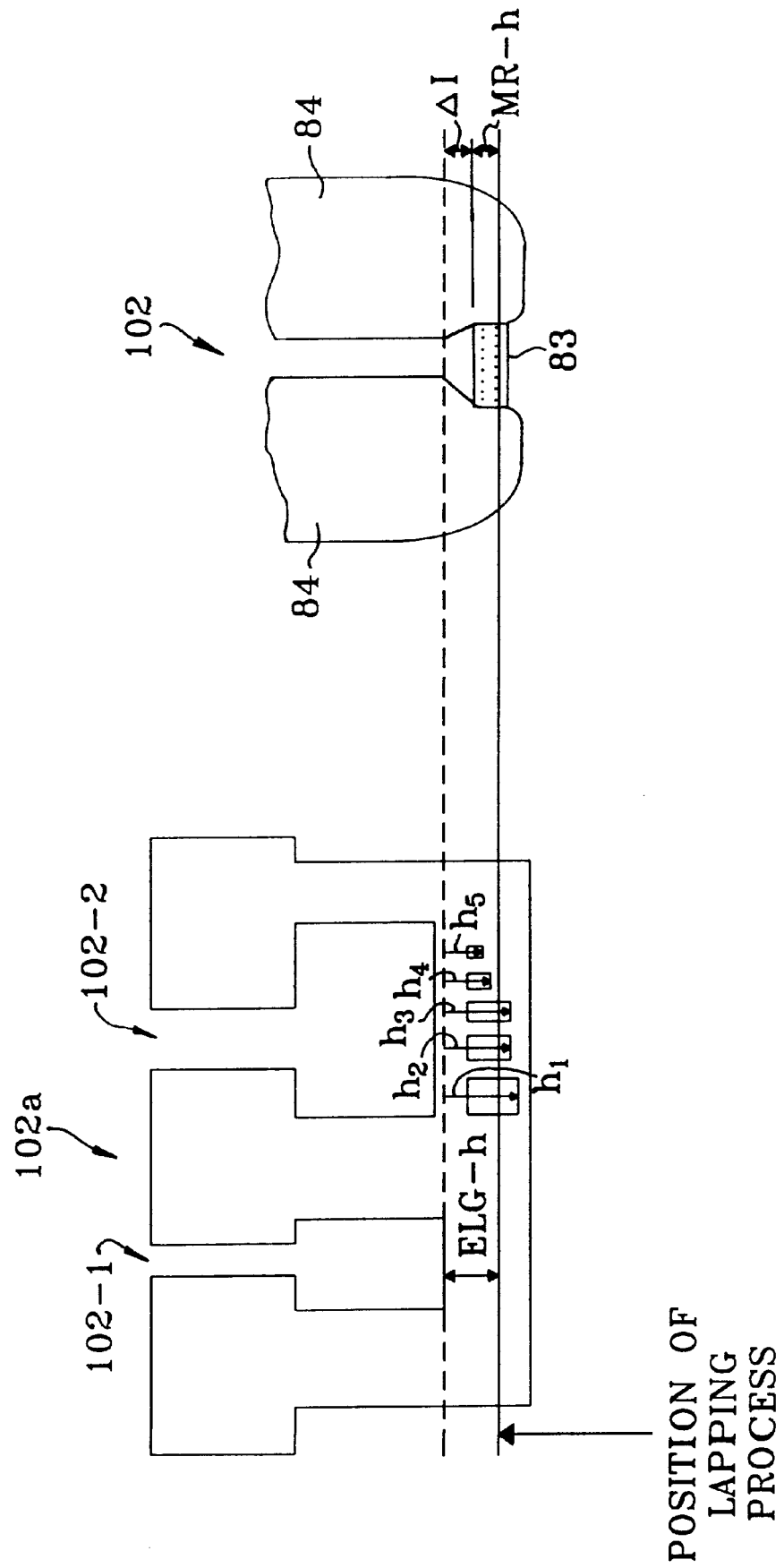
FIG. 20 is an explanatory diagram of converting MR-h shown in FIG. 17.
Figure 21:
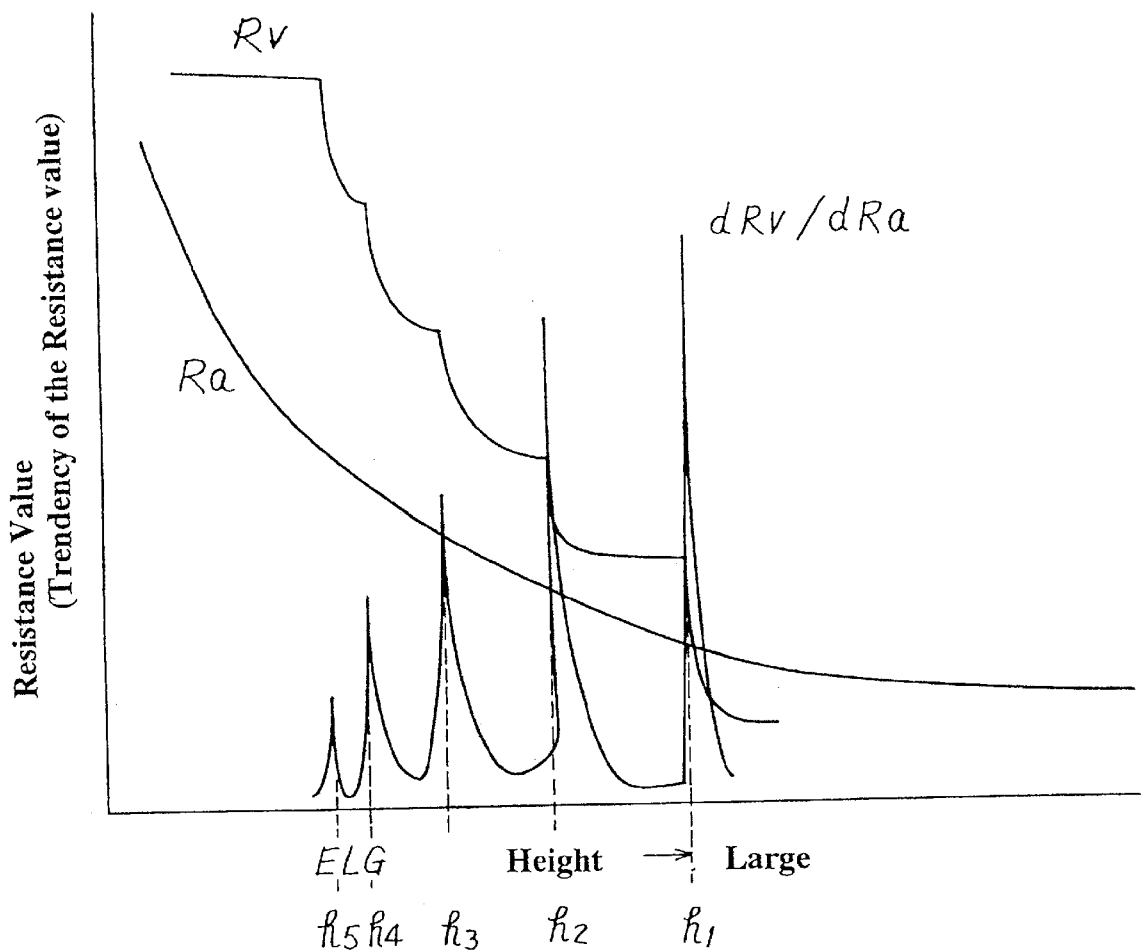
FIG. 21 is an explanatory diagram for detecting digital off position shown in FIG. 18.
Figure 22A:
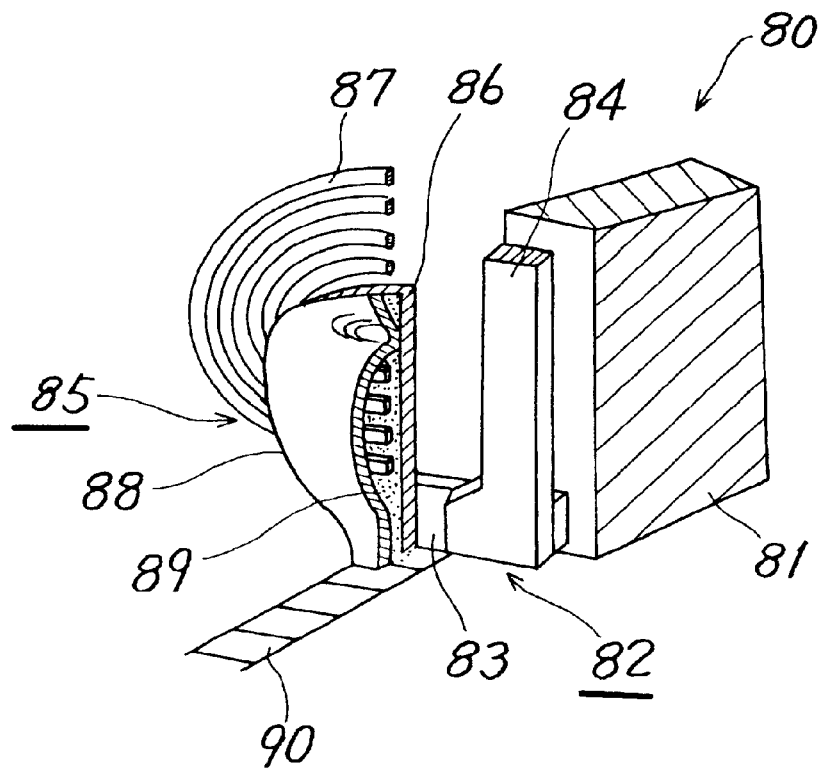
FIGS. 22A and 22B are explanatory diagrams of a compound type magnetic head.
Figure 22B:
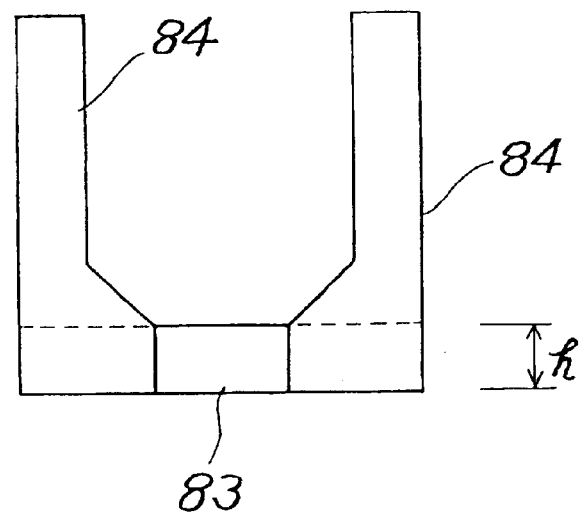
Figure 23A:
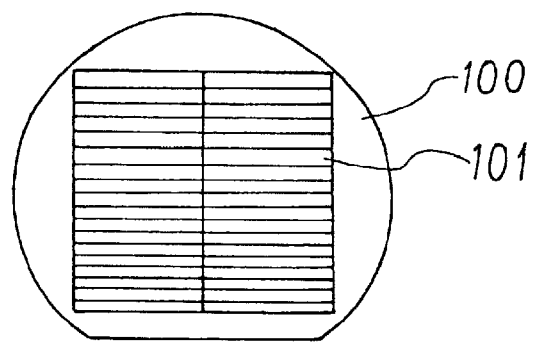
FIGS. 23A, 23B and 23C are first explanatory diagrams of manufacturing a magnetic head.
Figure 23B:
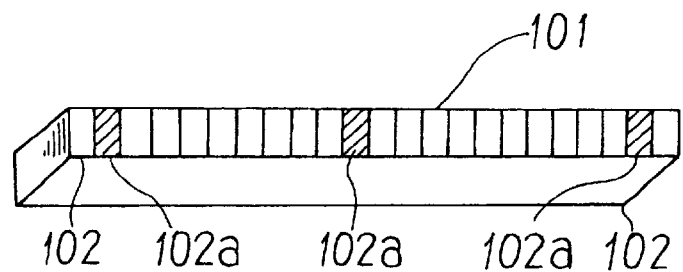
Figure 23C:
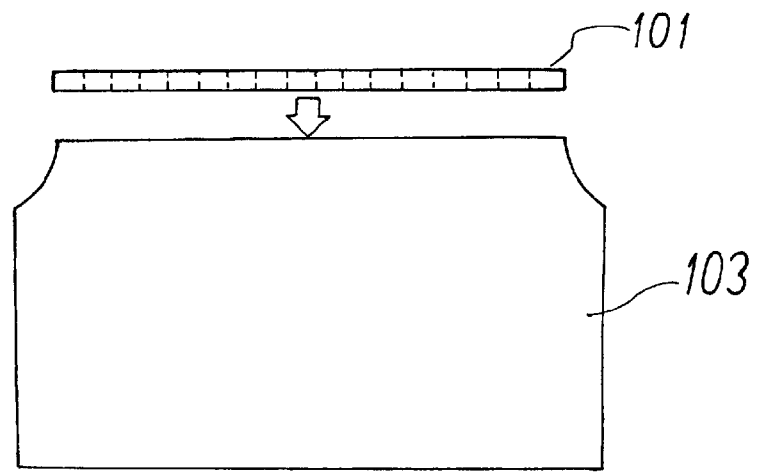
Figure 24A:
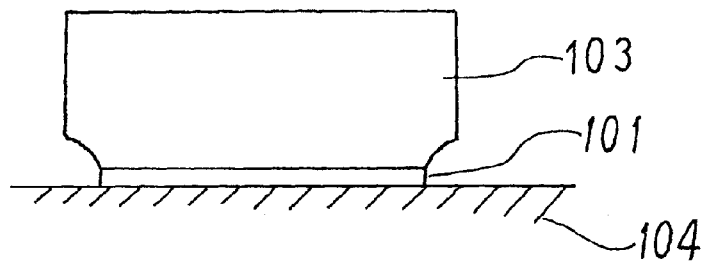
FIGS. 24A, 24B, 24C and 24D are second explanatory diagrams of manufacturing a magnetic head.
Figure 24B:
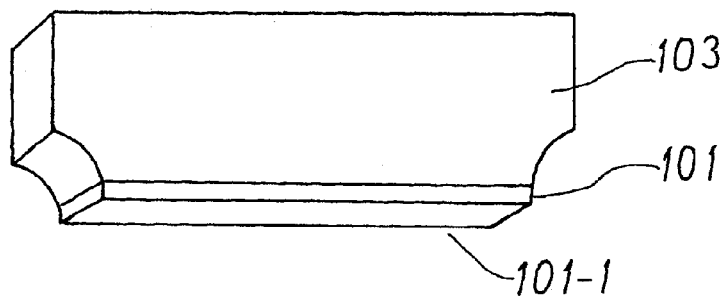
Figure 24C:
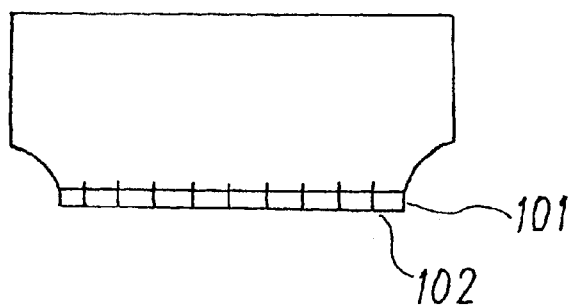
Figure 24D:
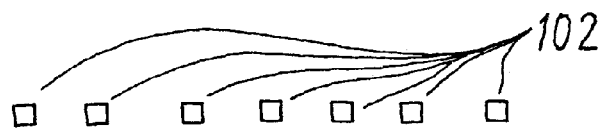
Figure 25A:
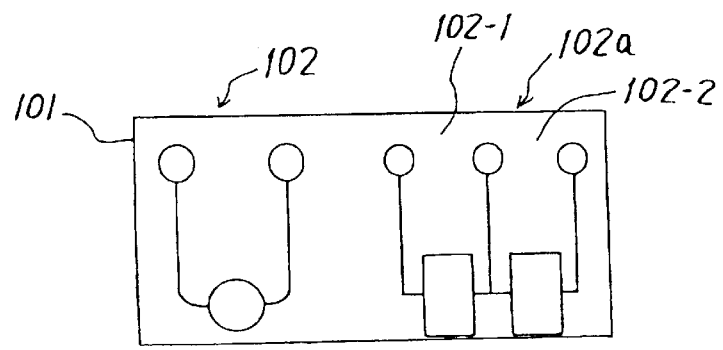
FIGS. 25A and 25B are explanatory diagrams of the problems in detecting digital resistance values.
Figure 25B:
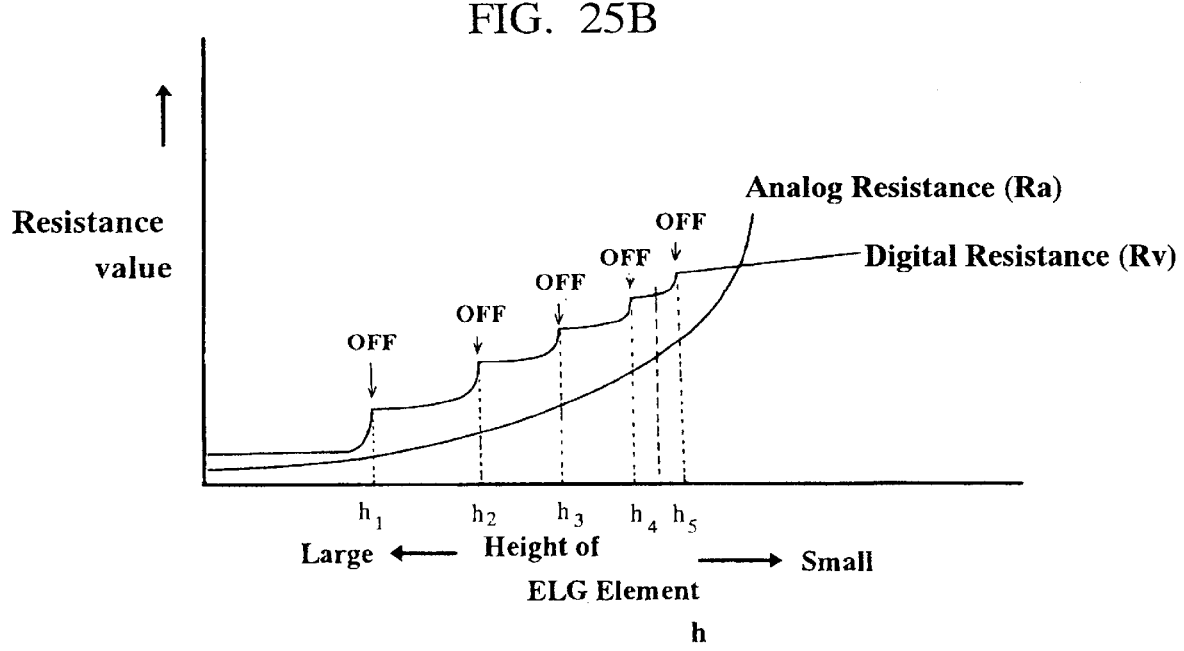

FIG. 14 is a block diagram of one embodiment according to the present invention, and FIGS. 15 and 16 are operational flow charts for lapping the work piece in the one embodiment. FIG. 17 is an operational flowing chart of a MR-h measurement, FIG. 18 is an operational flow chart for detecting digital off positions shown in FIG. 17, FIG. 19 is an explanatory diagram for removing noise, FIG. 20 is an explanatory diagram for converting MR-h shown in FIG. 17, and FIG. 21 is an explanatory diagram for detecting digital off positions shown in FIG. 18.

As shown in FIG. 14, a scanner 180 switches channels of each probe 140a. A constant current supply 181 supplies a constant current for resistance measurement. A digital multi meter 182 measures a voltage according to an output from the scanner 180 and converts the voltage into the value of resistance. A rotary motor 104a on the lapping plate rotates the lapping plate 104.

A personal computer (hereinafter called as a controller) 183 converts the measured value of resistance output from the digital multi-meter 182 into the height of the ELG element (MR-h) to control each section. That is, the controller 183 controls a swing motor 155 on a lapping plate 104, a bending motor 171, a correction ring motor 161, and a rotary motor 104a. The controller 183 controls each of the pressure cylinders 13L, 13C and 13R. The controller 183 further controls a cylinder 120 for the unload mechanism 12 and a cylinder 141 for the probe mechanism 14. The controller 183 receives an output of the swing sensor 15 of the swing mechanism to control the unload mechanism 12.

Hereinafter, a processing by the controller 183 will be explained in conjunction with FIGS. 15 and 16.

At first, initial values are input by employing an input unit of the controller 183 (STEP S1). The initial values are, for example, a number of a semiconductor wafer, a row bar address or the like. After inputting the initial values, an operator sets the adapter 11 on the lapping base 10, and then, turns a start switch on (STEP S1-1).

The controller 183 activates the lapping plate 104 to be rotated (STEP S2). That is, the controller 183 makes the motor 104a rotate in order to rotate the lapping plate 104 with high speed. The controller 183 rotates a swing motor 155 for a swing operation. The controller 183 further rotates the modified ring motor 161. The controller 183 starts to supply slurry.

Then, the controller 183 turns the center cylinder 13C on (STEP S2-1). Thereby, coarse processing (STAGE 1) is performed with the load of the one pressure cylinder. Burrs are removed from the row bar 101 by coarse processing.

The controller 183 reads the resistance value from the digital multi meter 182 to measure MR-h explained in FIGS. 17 and 18 (STEP S3). The controller 183 starts a timer to count from the starting of lapping of the work piece, and judges whether or not the value of the timer has become 60 seconds. If the value of the timer is within 60 seconds, the controller 183 measures MR-h (STEP S3-1). That is, smoothing is performed for 60 seconds. While coarse processing, the controller 183 measures MR-h to detect off positions of the digital resistance described above.

The controller 183 finishes coarse processing after elapsing 60 seconds. Then, the controller 183 turns all cylinders 13L, 13C and 13R of the pressure mechanism 13 on (STEP S4). That is, the controller 183 chamfers the surface of the work piece 101 by adding the load (STAGE 2). The chamfering may prevent the ELG element 102a on the row bar 101 from being shorted.

The controller 183 reads the resistance value from the digital multi meter 182 to measure MR-h explained in FIGS. 17 and 18 (STEP S5). The controller 183 judges whether or not MR-h of all ELG elements positioned on the left side, the center and the right side are less than 8.0 microns (STEP S5-1). If the MR-h of all ELG elements are not less than 8.0 microns, the controller 183 measures the MR-h. This is because the present applicant found that partial short status can be removed if all of MR-h reach 8.0 microns. As the resistance value on the ELG element shows an abnormal value on the partial short status, the controller 183 removes the status.

Then, a partial short status occurs on the ELG element, and the value Ra of the analog resistance becomes abnormal. Therefore, the converted height MR-h also becomes abnormal. The partial short status can be removed and the abnormal value is cancelled if all of MR-h achieve 8.0 microns. Thereby, the processing goes to a controlling process with the use of the value of the analog resistance.

After removing the short status, the warp compensation and light-left difference compensation (STAGE 3) are performed (STEP S6). The controller 183 rotates the bending motor 171 described in FIG. 12 to compensate the warp. The amount of the compensation is input to the controller 183 by measurement operation explained in FIG. 11. The controller 183 controls the bending motor 171 by the use of the compensation value.

The controller 183 reads the resistance value from the digital multi meter 182 and measures MR-h explained in FIGS. 17 and 18 (STEP S7).

The controller 183, in order to obtain the height of the ELG element at the center of gravity, calculates an average value between the MR-h (L) which is the height of the left ELG element and the MR-h (R) which is the height of the right ELG element. Then, the controller 183 calculates an average value between the average value obtained from the above-described calculation and the MR-h(C) which is the height of the center ELG element to obtain the MR-h(G) which is the height of the ELG element on the center of gravity. The controller 183 judges whether or not the MR-h (G) on the center of gravity is less than (the targeted MR-h—the finishing width) (STEP S8). If the MR-h (G) of the ELG element on the center of the gravity is not less than (the targeted MR-h—the finishing width), left-right difference modification is performed. The controller 183 finds a difference X between the MR-h (L) which is the height of the left ELG element and the MR-h (R) which is the height of the right ELG element (STEP S8-1).

If the difference X is more than −0.03 microns, the right end of the row bar 101 is 0.03 microns (allowable amount) higher more than the left end. Therefore, the left pressure cylinder 13L in the pressure mechanism 13 is turned off to lighten the load on the left end, and then the process returns back to step S7 (STEP S8-2).

On if the other hand, the difference X is more than 0.03 microns, the left end of the row bar 101 is 0.03 microns (allowable amount) higher than the right end. Therefore, the right cylinder 13R is turned off to lighten the load on the right end, and then, the process returns back to step S7 (STEP S8-3).

When the difference X is between −0.03 microns and 0.03 microns, the left-right difference of the row bar 101 is in the allowable range. Then, all of the pressure cylinders 13L, 13C and 13R are turned to on, and the process returns back to step S7 (STEP S8-4).

The controller 183 confirms the warp amount (STEP S9). At first, a difference Y between of the MR-h (C) which is the height of the center ELG element and the average value between the MR-h of the heights of the ELG elements on the left and right ends is obtained. The controller 183 judges whether or not the difference Y is more than the allowable value of 0.03 microns. If the difference is not more than 0.03 microns, the process goes to the next step S10. On the other hand, if the difference Y is more than the allowable value, the warp compensation amount explained in the step S6 is performed (STEP S9-1). The compensation amount is obtained from the above-described difference Y.

The controller 183 goes to the fine processing (STAGE 4). Then, the controller 183 controls the motor 104a to reduce the rotation speed of the lapping plate 104. The controller 183 turns all of the pressure cylinders 13L, 13C and 13R in the pressure mechanism 13 off. The finishing process is performed without giving the load (STEP S10).

The controller 183 reads the resistance value from the digital multi meter 182 to measure the MR-h described in FIGS. 17 and 18 (STEP S11). The controller 183 judges whether or not the MR-h (G) that is the height of the ELG element on the center of gravity is less than the targeted value (STEP S11-1).

When the controller 183 detects that the height MR-h (G) is less than the targeted value, the processing is controlled for finishing. The controller 183 judges whether or not the swing sensor 153 described in FIG. 3 is turned on (STEP S12). When the swing sensor 153 is turned on, as described above, the lapping base 10 is positioned on the predetermined position P.

The controller 183 activates the probe cylinder 141 to evacuate the probe 140 (STEP S12-1). Next, the controller 183 activates the unload cylinder 120 of the unload mechanism 12 to evacuate the mounting base 103 from the lapping plate 104 (STEP S12-2). Then, the controller 183 stops the lapping plate 104 and finishes the processing (STEP S12-3).

In this way, the coarse processing and the fine processing are continuously executed by changing conditions for the lapping. Therefore, it is possible to realize high productivity differently in comparison with the apparatus in which coarse and fine processings are discontinuously or separately executed. Further, it is also possible to save an operator from troublesomeness.

The MR-h measurement will be explained according to FIGS. 17 and 18.

The controller 183 reads the resistance value from the digital multi meter 182 (STEP S20). The digital multi meter 182 respectively measures the values Ra and Rv of the analog resistance 102-1 and the digital resistance 102-2 in an ELG element 102a.

The controller 183 compares the previously measured resistance value R0 with the just measured resistance value R1 (STEP S21).

If the previously measured resistance value R0 is larger than the value R1, the previously measured value R0 is employed as the resistance value R (STEP S21-1). If the value R0 is not larger than the value R1, the value R1 is employed as the value R (STEP S21-2).

Figure 19A:
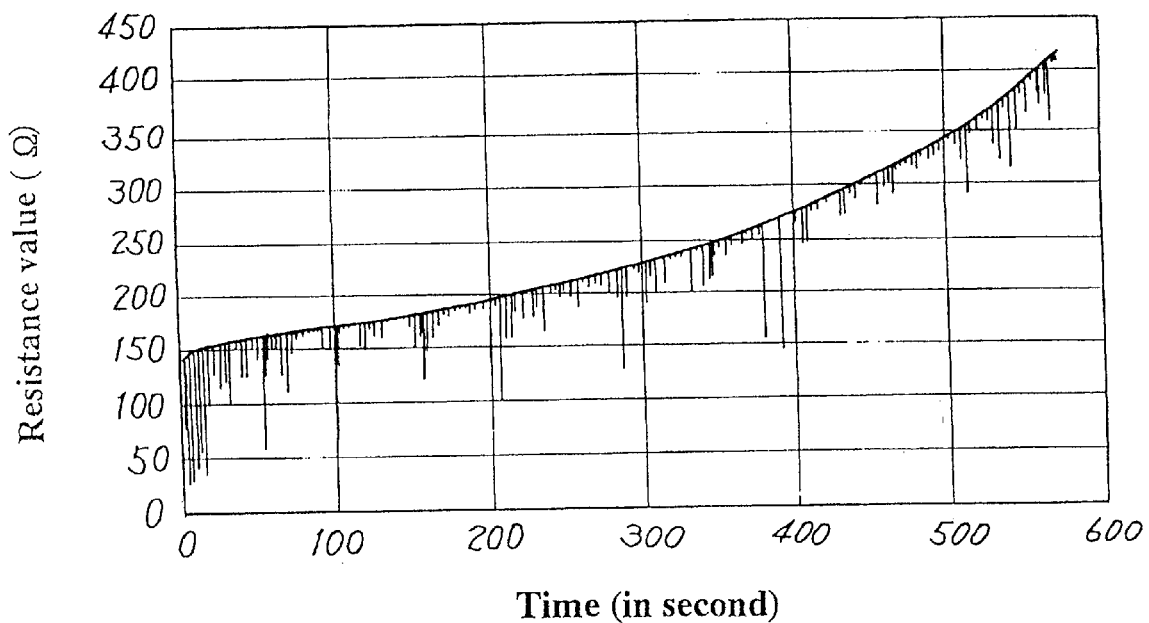
FIGS. 19A and 19B are explanatory diagrams showing removal of noise discussed in connection with FIG. 17.
Figure 19B:
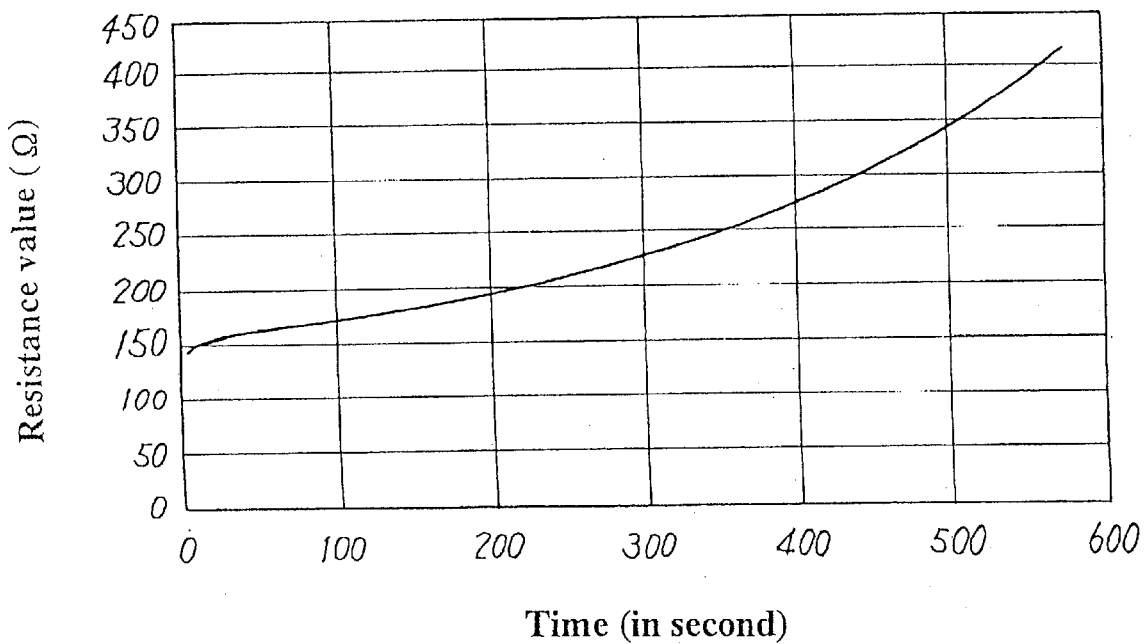

As explained in FIG. 9B, the value of resistance becomes larger, depending on the reduction of the height of the element. Accordingly, if it is normal, the value of a later sampling is larger than a value of resistance of a previously measured sampling. However, there is a case where the value of resistance becomes abnormal due to a partial short status of the element or influence of abrasive liquid. To remove the abnormal value of resistance, the following process is performed:

The measured resistance value shown in FIG. 19A includes noise (abnormal resistance value). The noise can be removed by a removing process as shown in FIG. 19B. Therefore, it is possible to obtain the correct resistance value. Each correct value, from which the noise is removed can be obtained for the values Ra and Rv of the analog resistance 102-1 and the digital resistance 102-2, because the removing process of the noise is executed separately for the analog and digital resistances.

The controller 183 judges whether or not the resistance values of all ELG elements have been measured (STEP S22). If the measurement has not been finished for all ELG elements, a channel of the scanner 180 is switched, and the process is returned to the step sSO (STEP S22-1).

When the controller 183 finishes the measurement of the resistance values for all ELG elements, the controller 183 detects an off position of the digital resistance element from the variation of the resistance value (STEP S23) as shown in FIG. 17. As described above, when the controller 183 detects the off position of the digital resistance element, the controller 183 obtains coefficients shown in the equation (1). The controller 183 converts the measured resistance value R into the height MR-h and finishes the process (STEP S23-1).

An operation for detecting digital off positions will be explained in conjunction with FIG. 18.

The controller 183 detects variation of the value of the digital resistance 102-2 to detect off positions of the digital resistance 102-2. Therefore, the value of the digital resistance Rv is differentiated with the value of the analog resistance Ra (STEP S30). The differential equation can be expressed as follows;

$$dRv/dRa = [Rv(n) - Rv(n-1)]/[Ra(n) - Ra(n-1)] \quad (2)$$

where Rv(n) is a value of the digital resistance on nth sampling, Rv(n−1) is a value of the digital resistance on (n−1)th sampling, Ra (n) is a value of the analog resistance on nth sampling, and Ra(n−1) is a value of the analog resistance on (n−1)th sampling.

As shown in FIG. 21, the value Ra of the analog resistance 102-1 shows sharp variation corresponding to the height of the ELG element 102a. The relationship between the positions of the analog resistance 102-2 and the digital resistance 102-1 is fixed. Therefore, it is possible to obtain a large differential value on the off positions of the digital resistance by differentiating the value Rv of the digital resistance with the value Ra of the analog resistance. Thereby, it is also possible to accurately detect the off times of the digital resistance, and further it is easy to detect the positions.

The controller 183 compares the differentiated value dRv/dRa with a predetermined threshold value. When the differentiated value is more than the threshold value (STEP S31), the off positions of the digital resistance can be detected, and the processing goes to the next step S32. When the differentiated value is equal or less than the threshold value, it is determined that the off positions of the digital resistance cannot be detected, and then, the process goes to a step S33.

After detecting the off positions of the digital resistance, the controller 183 calculates coefficients of the equation (1) (STEP S32-1). In this example, it is assumed that the digital resistance 102-2 has five off positions h1 to h5 as shown in FIG. 20.

Two off positions are required to obtain the coefficients a and b of the equation (1). For example, the coefficients a and b can be obtained from the off positions h (n) and h (n−1), and values Ra (n) and Ra (n−1) of the analog resistance on the off positions h (n) and h (n−1) (S32-2).

That is, the following two equations can be obtained from the equation (1);

$$Ra(n-1)=a/h(n-1)+b \quad (3)$$

$$Ra(n)=a/h(n)+b \quad (4)$$

When the coefficients in the equations (3) and (4) are solved, the following two equations can be obtained;

$$a=[Ra(n)-Ra(n-1)]\cdot h(n)\cdot h(n-1)/[h(n)]-[h(n-1)] \quad (5)$$

$$b=a/h(n)-Ra(n) \quad (6)$$

Then, the coefficients are updated (STEP S33).

The controller 183 converts the value Ra of the analog resistance to the height h(ELG-b) of the ELG element 102a according to the above-described equation (1) (STEP S34).

The equation (1) can be modified as follows;

$$ELG-h=(Ra-b)/a \quad (7)$$

Here, an end of a pattern of the ELG element 102a is not on the same position as that of the magnetic resistance film 83 in the magnetic head 102. This is because errors in sub-microns occur on steps for forming thin films on the wafer 100. The height MR-h of the magnetic resistance film 83 is different from the height ELG-h of the ELG element 102a. A difference $\Delta I$ between the heights MR-h and ELG-h is generated. Therefore, the equation (7) can be modified as follows;

$$MR-h=(ELG-h)-\Delta I$$

$$=(Ra-b)/a-\Delta I \quad (8)$$

An accurate height of the magnetic resistance film 83 can be obtained according to the equation (8).

The difference $\Delta I$ differs in each wafer. After forming thin films of the magnetic resistance film 83 and ELG element 102a, the difference $\Delta I$ should be measured by using optical measurement tool such as a CCD camera. Then, the measured difference $\Delta I$ is input to the controller 183. Thereby, the corresponding $\Delta I$ can be automatically obtained by inputting the number of the wafer.

In this way, the off positions of the digital resistance 102-2 can be obtained by differentiating the value of the digital resistance 102-2 with the value of the analog resistance 102-1. The value of the analog resistance 102-1 shows a sharp variation with the reduction of the height of the ELG element. The differential value becomes larger by differentiating the value of the digital resistance 102-2 with the value of the analog resistance 102-1. Thereby, it becomes possible to accurately detect the off positions of the digital resistance 102-2.

Therefore, the relationship between the value of the analog resistance 102-1 and the height of the thin film element can be accurately corrected. Thereby, it becomes possible to control the lapping process by detecting the analog resistance.

Further, the resistance value of the monitoring element 102a show a tendency to become larger as the height of the work piece, which is bonded to a row bar 101, becomes smaller. Therefore, if the measured resistance value is normal, the currently measured value should be larger than the previously measured value. If the currently measured value is less than the previously measured value, it is considered that an abnormal value is measured for some reason. By removing the abnormal value, it is possible to accurately control the lapping process according to the measurement of the resistance value. Then, the currently measured resistance value is removed, i.e., the measured resistance value is lost. However, the normal previously measured value is employed to compensate the value, thus improving the accuracy of the lapping process.

Additionally, it is also possible to realize high productivity as coarse-processing and fine processing are continuously executed by varying the processing speed in one lapping apparatus. Further, it becomes possible to reduce time for operations as the work piece is set on the apparatus only one time.

Although the present invention has been described with reference to embodiments, the invention is not restricted to those. The following modification can be applicable.

(1) In the above-described embodiments, a row bar formed of a row of the magnetic heads as lapped parts is explained as one example. However, it is possible to apply the present invention to lap other parts.

(2) Other elements can be used as the elements for monitoring.

As explained above, the present invention takes effect as follows:

(1) Since the off positions of the digital resistance 102-2 can be detected by differentiating the value of the digital resistance 102-2 with the value of the analog resistance 102-1, it is possible to accurately detect the off positions of the digital resistance. Thereby, it is possible to accurately correct the relational equation by detecting the off positions of the digital resistance, and improve the accuracy of the lapping processes when measuring the value of the analog resistance to control the lapping processes.

(2) As the previously measured resistance value is employed when the previously measured value is larger than the currently measured value, it is possible to remove noise caused by a condition for lapping elements. Therefore, it becomes possible to improve accuracy of the lapping processes when the lapping processes are controlled by measuring the value of the analog resistance.

The present invention may be embodied in other specific forms without departing from the spirit or essential characteristics thereof. It should of course be understood that those which are the same as the technical concept of the invention are within the protective scope of the present invention.

What is claimed is:

1. An automatic lapping method for lapping a thin film element with a monitoring element having an analog resistance, a value of which is analogously varied and a digital resistance, value of which is digitally varied in a process of lapping the thin film element, comprising the steps of:

converting the value of the analog resistance to correspond to a height of the thin film element according to a correlation equation expressing a relationship between the value of the analog resistance and the height of the thin-film element;

the step of converting including, differentiating the value of the digital resistance with respect to the value of the analog resistance, detecting off-positions of the digital resistance of the monitoring element according to the differentiated value of the digital resistance;

correcting the correlation equation by measured values of the analog resistance on off-timings of the digital resistance;

controlling stopping of lapping of the thin film element when the height of said thin-film element reaches a target value.

2. The automatic lapping method for lapping a thin film element according to claim 1, wherein the step of detecting the off-positions of the digital resistance includes the steps of;

subtracting a previously measured value of the digital resistance from the most recently measured value of the digital resistance to obtain a subtracted digital resistance value, subtracting a previously measured value of the analog resistance from the most recently measured value of the analog resistance to obtain a subtracted analog resistance value, dividing the subtracted digital resistance value with the subtracted analog resistance value to calculate a quotient, and judging whether or not the calculated quotient is more than a predetermined value.

3. The automatic lapping method according to claim 1, wherein the converting step further includes the step of employing a previously measured analog resistance value and a previously measured digital resistance value as the value of the analog resistance and the value of the digital resistance when a currently measured analog resistance value and a currently measured digital resistance value is less than the previously measured analog resistance value and the previously measured digital resistance value.

4. An automatic lapping apparatus for lapping a thin film element comprising;

a lapping plate for lapping a work piece, which is bonded to a row bar, the work piece having a monitoring element including an analog resistance, a value of which is analogously varied and a digital resistance, a value of which is digitally varied in process of lapping the thin film element; and a controller for converting the analog resistance value of the monitoring element to corresponding height of the thin-film element according to a correlation equation expressing a relationship between the value of the analog resistance and the height of said thin-film element and for controlling the lapping plate to stop lapping the work piece when the height of said thin-film element reaches a predetermined value, wherein in the conversion by the controller, the controller differentiates the value of the digital resistance with respect to the value of the analog resistance, detects off positions of said digital resistance corrects the correlation equation by the measured value of the analog resistance on the off positions of said digital resistance.

5. The automatic lapping apparatus according to claim 4, wherein the controller subtracts a previously measured value of the digital resistance from the most recently measured value of the digital resistance to obtain a subtracted digital resistance value, subtracts a previously measured value of the analog resistance from the most recently measured value of the analog resistance to obtain a subtracted analog resistance value, divides the subtracted digital resistance value with the subtracted analog resistance value to calculate a quotient, and judges whether or not the obtained quotient is more than a predetermined value.

6. The automatic lapping apparatus according to claim 4, wherein the controller employs a previously measured analog resistance value and a previously measured digital resistance value as the value of the analog resistance and the value of the digital resistance when a currently measured analog resistance value and a currently measured digital resistance value is less than the previously measured analog resistance value and the previously measured digital resistance value.

* * * * *

UNITED STATES PATENT AND TRADEMARK OFFICE
CERTIFICATE OF CORRECTION

PATENT NO.   : 6,132,290
DATED        : October 17, 2000
INVENTOR(S)  : Sugiyama et al.

Page 1 of 1

It is certified that error appears in the above-identified patent and that said Letters Patent is hereby corrected as shown below:

Title page,
Under item [56] References Cited, after U.S. PATENT DOCUMENTS, insert
-- 5,463,805  11/1995  Mowry et al. ............... 29/603 --.

Claim 1,
Line 4, before "value" insert -- a --.
Line 20, after "resistance" insert -- and --.

Claim 4,
Line 20, after "resistance" insert -- , -- (a comma).

Signed and Sealed this

Twenty-ninth Day of January, 2002

Attest:

Attesting Officer

JAMES E. ROGAN
Director of the United States Patent and Trademark Office